(12) United States Patent
Portnoy et al.

(10) Patent No.: US 11,907,996 B2
(45) Date of Patent: Feb. 20, 2024

(54) ITEM RECOMMENDATION CONTROL PLATFORM

(71) Applicant: Target Brands, Inc., Minneapolis, MN (US)

(72) Inventors: Jacob Portnoy, Minneapolis, MN (US); Anupama Joshi, San Francisco, CA (US); Sayon Majumdar, Sunnyvale, CA (US); Ken Dombeck, Eden Prairie, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/460,930

(22) Filed: Aug. 30, 2021

(65) Prior Publication Data

US 2023/0063256 A1 Mar. 2, 2023

(51) Int. Cl.
G06Q 30/0601 (2023.01)
G06Q 10/087 (2023.01)
G06Q 10/083 (2023.01)

(52) U.S. Cl.
CPC ....... *G06Q 30/0631* (2013.01); *G06Q 10/083* (2013.01); *G06Q 10/087* (2013.01); *G06Q 30/0633* (2013.01); *G06Q 30/0641* (2013.01)

(58) Field of Classification Search
CPC .......... G06Q 30/0631; G06Q 30/0633; G06Q 30/0641; G06Q 10/083; G06Q 10/087
See application file for complete search history.

(56) References Cited

U.S. PATENT DOCUMENTS

| | | | |
|---|---|---|---|
| 7,908,183 B2 | 3/2011 | Jacobi et al. | |
| 7,921,042 B2 | 4/2011 | Jacobi et al. | |
| 9,070,156 B2 | 6/2015 | Linden et al. | |
| 9,830,632 B2 | 11/2017 | Lenahan et al. | |
| 9,922,360 B2 | 3/2018 | Hendrick et al. | |
| 10,242,384 B2 | 3/2019 | Otis et al. | |
| 10,325,285 B1* | 6/2019 | Wai | G06Q 30/0255 |
| 11,308,537 B1* | 4/2022 | Bell | G06Q 30/0643 |
| 11,316,900 B1* | 4/2022 | Schottland | H04L 63/0263 |

(Continued)

OTHER PUBLICATIONS

Recommender Systems in Commercial Use. Aldrich, Susan E. Al Magazine32.3: 28-34. Association for the Advancement of Artificial Intelligence. (Fall 2011) Retrieved via ProQuest. (Year: 2011).*

(Continued)

*Primary Examiner* — Michael Misiaszek
(74) *Attorney, Agent, or Firm* — Merchant & Gould P.C.

(57) ABSTRACT

An item recommendation control platform is disclosed. The item recommendation control platform presents an administrative user one or more user interfaces at which recommendation rules may be defined. Each of the recommendation rules may be associated with one or more nodes within a retail website, such as an item detail page or an item category page. The recommendation rules may be selected, defined, and prioritized, such that one or more item recommendation rules may be reflected within a given item recommendation presented on a retail website. The item recommendation rules can include one or more filters, the filters controlling which items may be recommended to a given user based, for example, on item availability or shipping availability.

19 Claims, 20 Drawing Sheets

(56) References Cited

U.S. PATENT DOCUMENTS

| | | | |
|---|---|---|---|
| 2002/0065745 A1* | 5/2002 | Rainsberger | G06Q 30/02 |
| | | | 706/47 |
| 2014/0180902 A1* | 6/2014 | Buck | G06Q 40/04 |
| | | | 705/37 |
| 2014/0223099 A1 | 8/2014 | Kidron | |
| 2015/0242944 A1 | 8/2015 | Willard et al. | |
| 2016/0171540 A1 | 6/2016 | Mangipudi et al. | |
| 2017/0004567 A1 | 1/2017 | Dutt et al. | |
| 2019/0073708 A1* | 3/2019 | Mitra | G06F 16/9535 |
| 2020/0098030 A1 | 3/2020 | Pizza et al. | |
| 2021/0241351 A1* | 8/2021 | Francis | G06Q 30/0631 |
| 2021/0287121 A1* | 9/2021 | Veillon | G06N 5/04 |

OTHER PUBLICATIONS

Adobe® Experience Cloud, Adobe Recommendations Classic, Dated Dec. 19, 2018; 88 Pages.

Criteria in Adobe Target Recommendations, Web Printed Date Nov. 23, 2020; 8 Pages.

Recommendations Activity settings in Adobe Target, Web Printed Date Nov. 23, 2020; 4 Pages.

Use a backup recommendation in Adobe Target Recommendations, Web Printed Date Nov. 23, 2020; 2 Pages.

Adobe Target Recommendations, Web Printed Date Nov. 23, 2020; 5 Pages.

* cited by examiner

FIG. 12

UI 804   Display 806

Rules
Themes
Placements
Settings
Reports
Administrative

All Items
Groc...
Hou...
Vide...
Co...
Vi...
Di...

Add Virtual Category

Edit Filters

Adaptive -- Add to Cart

ID: mwebch1

Name: Adaptive -- Add to Cart

Tags: Adaptive, Add to Cart

Notes: Mweb, reverting to non-adapt 1. cross_sell ▼    min:4 -> max:28
   Edit | Delete 2. prod_bundle ▼   min:2 -> max:4
   Edit | Delete 3. related_prods ▼ min:2 -> max:8
   Edit | Delete 4. top_sellers ▼   min:4 -> max:28
   Edit | Delete Cancel    Update ...gy Headline >
...y to Play!

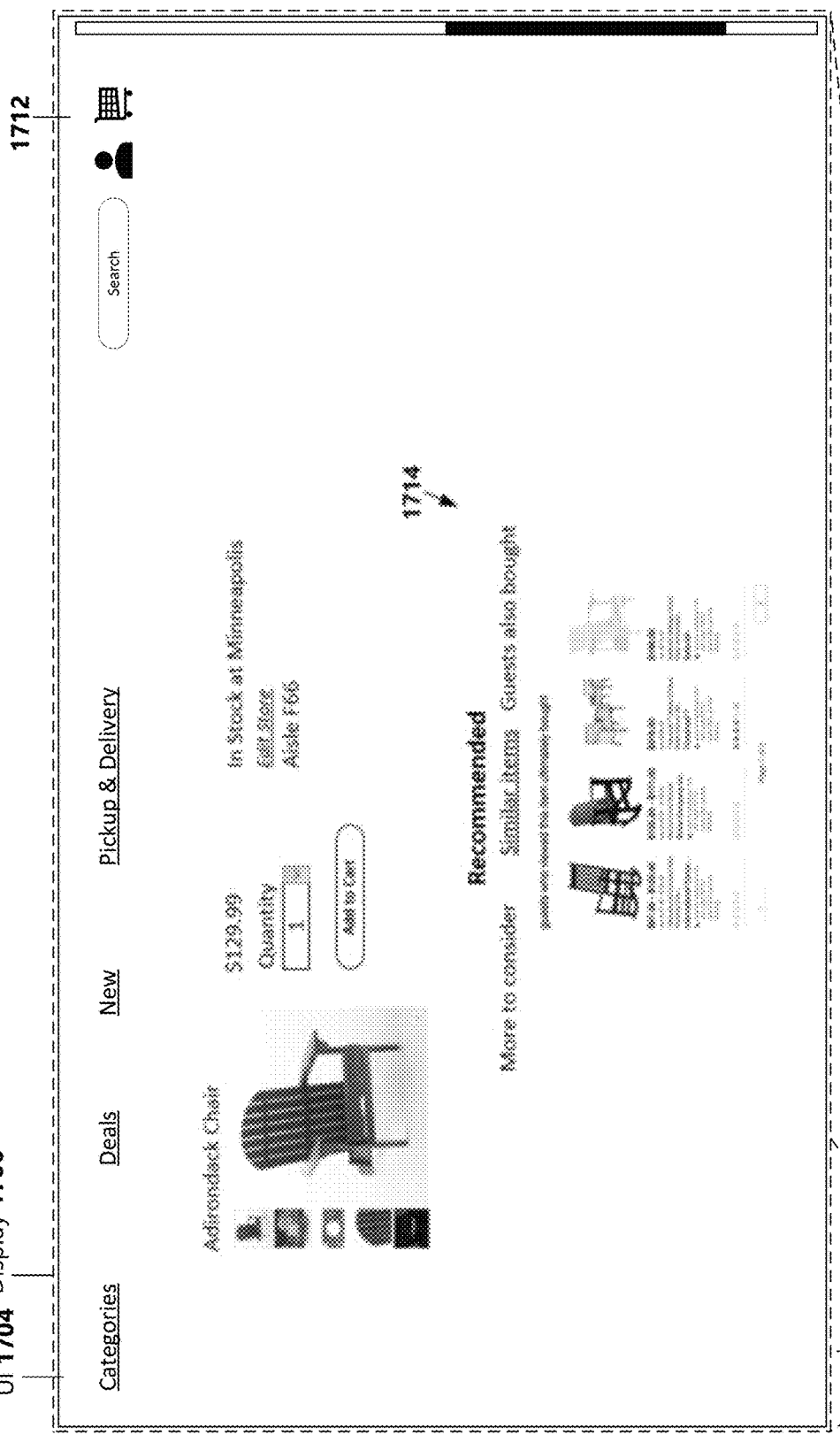
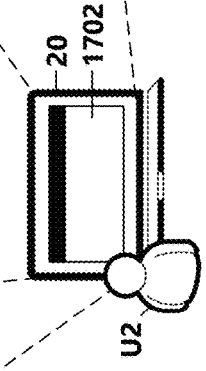
FIG. 17

ITEM RECOMMENDATION CONTROL PLATFORM

BACKGROUND

Retail websites generally include category pages, which display categories listing a number of items, as well as product pages which display product details of a particular item selected by a user. Often, on both category pages and product pages (also called item detail pages), recommendations for other items or types of items may be suggested to a user in an effort to encourage the user to buy other types of items while the user visits the retail website. For example, a user may be presented with a list of complementary items to the item that is currently being viewed, or may be presented with a list of similar items to the item that is being viewed. In some instances, the user may be presented with items that the user had viewed during a prior visit to the retail website.

Each of these types of collections of items that are presented to a user may be personalized to the user. That is, the specific collection of similar items or complementary items may be selected based on user activity to identify those items which are most likely to be attractive to the user based on that user's prior browsing history.

At times, a retailer may wish to adjust the recommendations presented on a particular category page or item detail page. For example, the retailer may wish to present complementary items in response to a user selecting a particular television that the user is considering for purchase (e.g., cables required for connecting to home stereo equipment, speaker systems, etc.) at a first time, and may wish to present alternative purchase recommendations to the user (e.g., other similar television sets for consideration) at a second time. Still further, within a given set of recommendations, the retailer may wish to adjust the ordering of particular item recommendations, for example based on particular brands or types of items that the retailer wishes to highlight to the customer.

However, there is not a convenient way to adjust recommendations for specific category pages or item detail pages to provide a more meaningful experience to the customer, in accordance with the adjustments desired by the retailer. Therefore, improvements in the manner in which a retailer can control presentation of product recommendations are desirable.

SUMMARY

In general, the present disclosure relates to an item recommendation control platform. In general terms, the item recommendation control platform presents an administrative user one or more user interfaces at which recommendation rules may be defined. Each of the recommendation rules may be associated with one or more nodes within a retail website, such as an item detail page or an item category page. The recommendation rules may be selected, defined, and prioritized, such that one or more item recommendation rules may be reflected within a given item recommendation presented on a retail website. The item recommendation rules can include one or more filters, the filters controlling which items may be recommended to a given user based, for example, on item availability or shipping availability.

In a first aspect, an item recommendation control platform includes a computing device having a processor and a memory. The computing device is communicatively connected to a retail web server. The memory stores instructions which, when executed, cause the computing device to: expose a portal to an administrative user, the portal generating a rules user interface having a plurality of item recommendation rule definition options that allow the administrative user to define an item recommendation rule for a particular node within a retail website, the plurality of item recommendation rule definition options including: receive a definition of at least one item recommendation rule at the portal associated with the particular node; publish the at least one item recommendation rule to a data store; and upon receipt of a request from a retail web server regarding an item recommendation rule in association with the particular node, serve an item recommendation rule to the web server, the item recommendation rule defining a selection or prioritization of items to be displayed on a web page corresponding to the particular node. The selection or prioritization of items is based, at least in part, on at least one of inventory availability or shipping eligibility within a predetermined timeframe.

In a second aspect, a system includes a retail web server and an item recommendation control platform. The item recommendation control platform includes a computing device having a processor and a memory, the computing device being communicatively connected to the retail web server. The memory stores instructions which, when executed, cause the computing device to: expose a portal to an administrative user, the portal generating a rules user interface having a plurality of item recommendation rule definition options that allow the administrative user to define an item recommendation rule for a particular node within a retail website, the plurality of item recommendation rule definition options including: receive a definition of at least one item recommendation rule at the portal associated with the particular node; publish the at least one item recommendation rule to a data store; and upon receipt of a request from a retail web server regarding an item recommendation rule in association with the particular node, serve an item recommendation rule to the web server, the item recommendation rule defining a selection or prioritization of items to be displayed on a web page corresponding to the particular node. Upon receipt of the item recommendation rule, the retail web server is configured to display the web page corresponding to the particular node including a recommendation region, the recommendation region displaying a plurality of items in accordance with the item recommendation rule, and wherein the selection or prioritization of items is based, at least in part, on at least one of inventory availability or shipping eligibility within a predetermined timeframe.

In a third aspect, a method of managing item recommendations presented on a retail website is disclosed. The method includes receiving, at a rules user interface, a selection of a particular node within a retail website and a definition of at least one item recommendation rule to be associated with the particular node, the at least one item recommendation defining a selection or prioritization of items is based, at least in part, on at least one of inventory availability or shipping eligibility within a predetermined timeframe. The method includes publishing the at least one item recommendation rule to a data store. The method also includes, upon receipt of a request from a retail web server regarding an item recommendation rule in association with the particular node, serving the item recommendation rule to the web server, the item recommendation rule defining the selection or prioritization of items to be displayed on a web page corresponding to the particular node.

BRIEF DESCRIPTION OF THE DRAWINGS

FIG. 12 is an example user interface for defining a hierarchy of strategies useable in an adaptive rule that can be executed upon receipt of an "add to cart" operation by a user of a retail website.

FIG. 13 is an example user interface for defining one or more placements of item recommendations within a retail website.

FIG. 17 is an example user interface illustrating aspects of a retail website that presents item recommendations according to a strategy selected using the item recommendation control platform.

DETAILED DESCRIPTION

As briefly described above, embodiments of the present invention are directed to an item recommendation control platform that may be integrated with a retailer website. In particular aspects, the item recommendation control platform allows a retailer to define a set of rules that prioritize specific ones of different sets of item recommendations for display on particular product pages, or for particular users. Additionally, the item recommendation control platform allows a retailer to adjust the prioritization of types of items within a given recommendation based on, e.g., promotional or other prioritization bases.

The item recommendation control platform described herein allows the retailer improved flexibility in customizing the way in which recommendations may appear on a given item category page or item detail page of a retail website for all users or for a particular user. The wide range of controls provided by the platform allow the retailer to maintain multiple item recommendation systems while selecting at the time of display of a product detail page or category page a particular recommendation type and selection of items within a given set of item recommendations.

Figure 1:
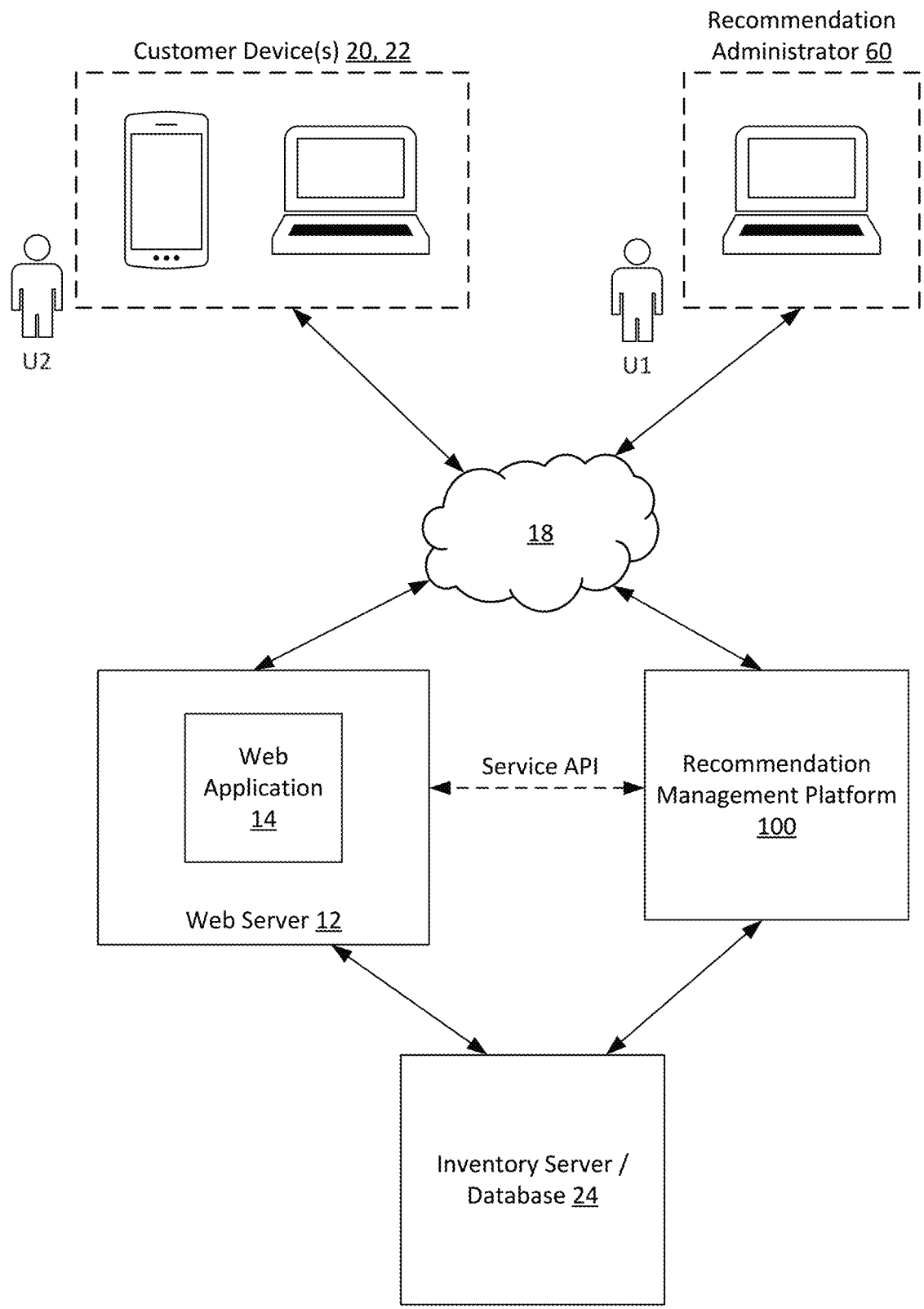
FIG. 1 illustrates an example environment in which the item recommendation control platform may be implemented.

Referring first to FIG. 1, a network system for providing product details within the context of a retail website is displayed. The network system 10 represents an example environment in which aspects of the present disclosure may be implemented.

In the example shown, a web server 12 hosts a web application 14, such as an application that may be displayed on one or more customer devices 20, 22. The customer devices 20, 22, for example mobile or desktop computing devices, may access the web application 14 via a network, such as the Internet 18.

In an example embodiment, the web application 14 corresponds to a retailer website at which product inventories may be displayed to the customer. That is, a request to view a retailer website may be received at the web application 14 from one of the customer devices 20, 22. The web application 14 may then access inventory information managed by the inventory server 24, which hosts a database of product information. The product information can include, for example, the collection of items carried by the retailer. In general, the Web server 12, web application 14, and inventory server 24 are associated with a retail enterprise, and customer devices 20, 22 are computing devices that are owned or controlled by customers of the retailer.

In the example shown, the web server 12 may access a recommendation management platform 100. The recommendation management platform 100 may provide product recommendations to be displayed on item category pages or item detail pages of a retail website. In accordance with the present disclosure, the recommendation management platform 100 implements an item recommendation control platform on which multiple item recommendation systems may be made available, and at which the selection of particular item recommendation systems and item recommendations are managed.

The recommendation management platform 100 may be configured to receive one or more algorithms or programs for generating item recommendations in association with item detail pages or item category pages hosted by a web server, (e.g., when viewed from a website or web application 14). In some examples, the recommendation management platform 100 may directly receive the algorithms or programs for generating item recommendations. In other examples, the recommendation management platform 100 may access existing algorithms or programs, for example stored at web server 12 or inventory server 24 (or another server within a retail enterprise) to enable the recommendation management platform to display available recommendation algorithms that may be selected by an administrative user as part of a rule definition process.

In the example shown, a recommendation administrator 60 may be located remotely from the recommendation management platform 100. The recommendation administrator may be part of the enterprise that provides the retail website, and is typically an administrative user (e.g., user U1) of the recommendation management platform 100. As described below, the recommendation administrator 60 may be provided a user interface for controlling recommendations that are displayed within a retail website via the web server 12. That is, the recommendation administrator 60 may access the recommendation management platform 100, view an administrative user interface to define specific rules that prioritize recommendation systems and specific item recommendations for use by a particular user, within a particular period of time, associated with particular items or categories of items, etc. Details regarding example types of rules are provided below.

In example implementations, the recommendation management platform 100 may be used to define behavioral rules, cross-selling rules, or theme-based rules, each of which define either a selection of items that are to be displayed on a particular retail webpage by the web server 12 or a manner of display of such items. In some examples described below, multiple recommendation strategies may be concurrently used to present an integrated recommendation or separate recommendations to a user (e.g., user U2, utilizing customer devices 20, 22) visiting the retail website hosted by the web server 12.

Figure 2:
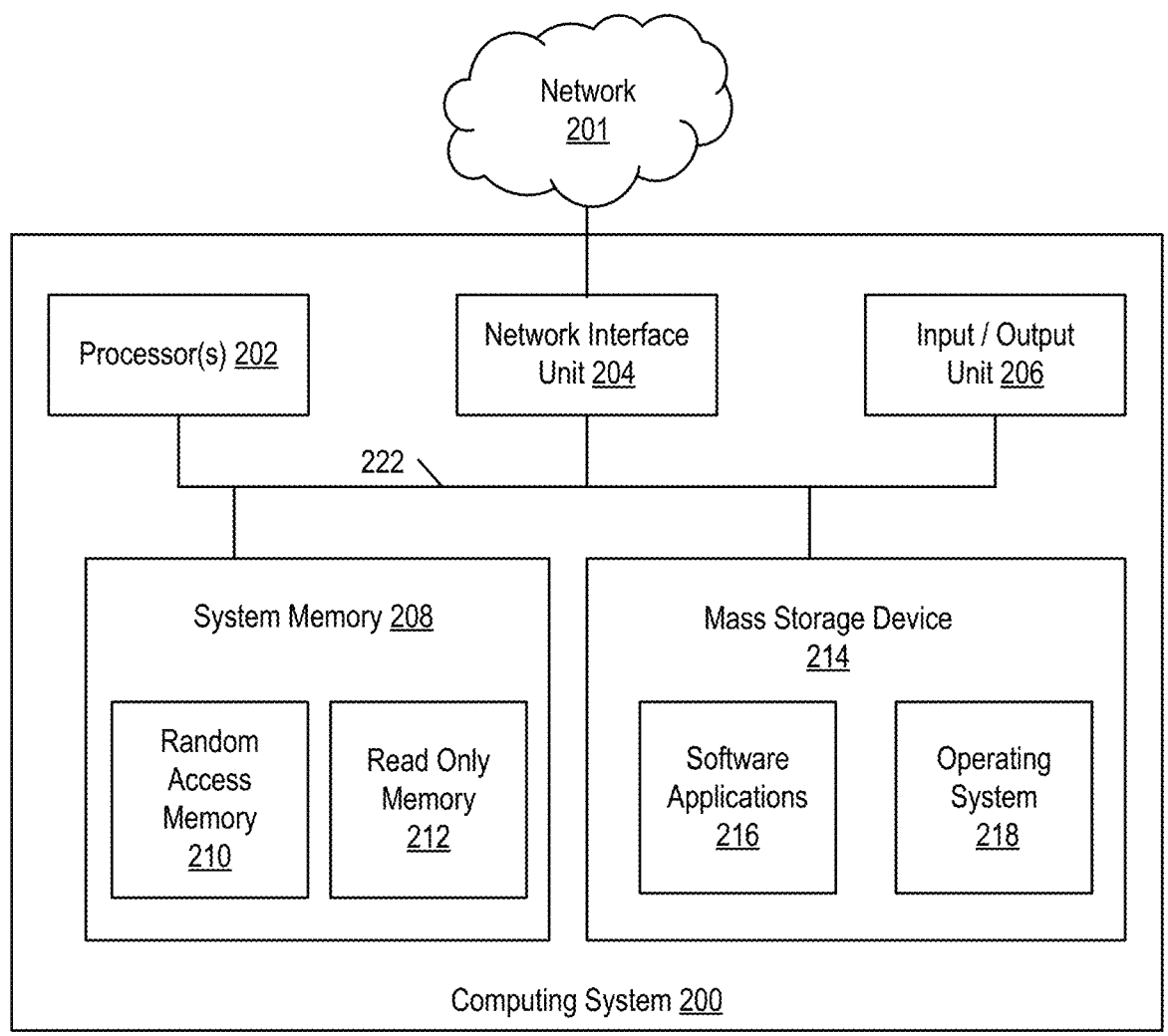
FIG. 2 is a block diagram of an example computing device useable to implement aspects of the present disclosure.

FIG. 2 illustrates an example block diagram of a virtual or physical computing system 200. One or more aspects of the computing system 200 can be used to implement the recommendation management platform 100, web server 12, or other computing systems described above in conjunction with FIG. 1.

In the embodiment shown, the computing system 200 includes one or more processors 202, a system memory 208, and a system bus 222 that couples the system memory 208 to the one or more processors 202. The system memory 208 includes RAM (Random Access Memory) 210 and ROM (Read-Only Memory) 212. A basic input/output system that contains the basic routines that help to transfer information between elements within the computing system 200, such as during startup, is stored in the ROM 212. The computing system 200 further includes a mass storage device 214. The mass storage device 214 is able to store software instructions and data. The one or more processors 202 can be one or more central processing units or other processors.

The mass storage device 214 is connected to the one or more processors 202 through a mass storage controller (not shown) connected to the system bus 222. The mass storage device 214 and its associated computer-readable data storage media provide non-volatile, non-transitory storage for the computing system 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through the network 201. The network 201 is a computer network, such as an enterprise intranet and/or the Internet. The network 201 can include a LAN, a Wide Area Network (WAN), the Internet, wireless transmission mediums, wired transmission mediums, other networks, and combinations thereof. The computing system 200 may connect to the network 201 through a network interface unit 204 connected to the system bus 222. It should be appreciated that the network interface unit 204 may also be utilized to connect to other types of networks and remote computing systems. The computing system 200 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the one or more processors 202, cause one or more of the systems, devices, or components described herein to provide functionality described herein. For example, the mass storage device 214 and/or the RAM 210 can store software instructions that, when executed by the one or more processors 202, cause the computing system 200 to receive and execute managing network access control and build system processes.

Figure 3:
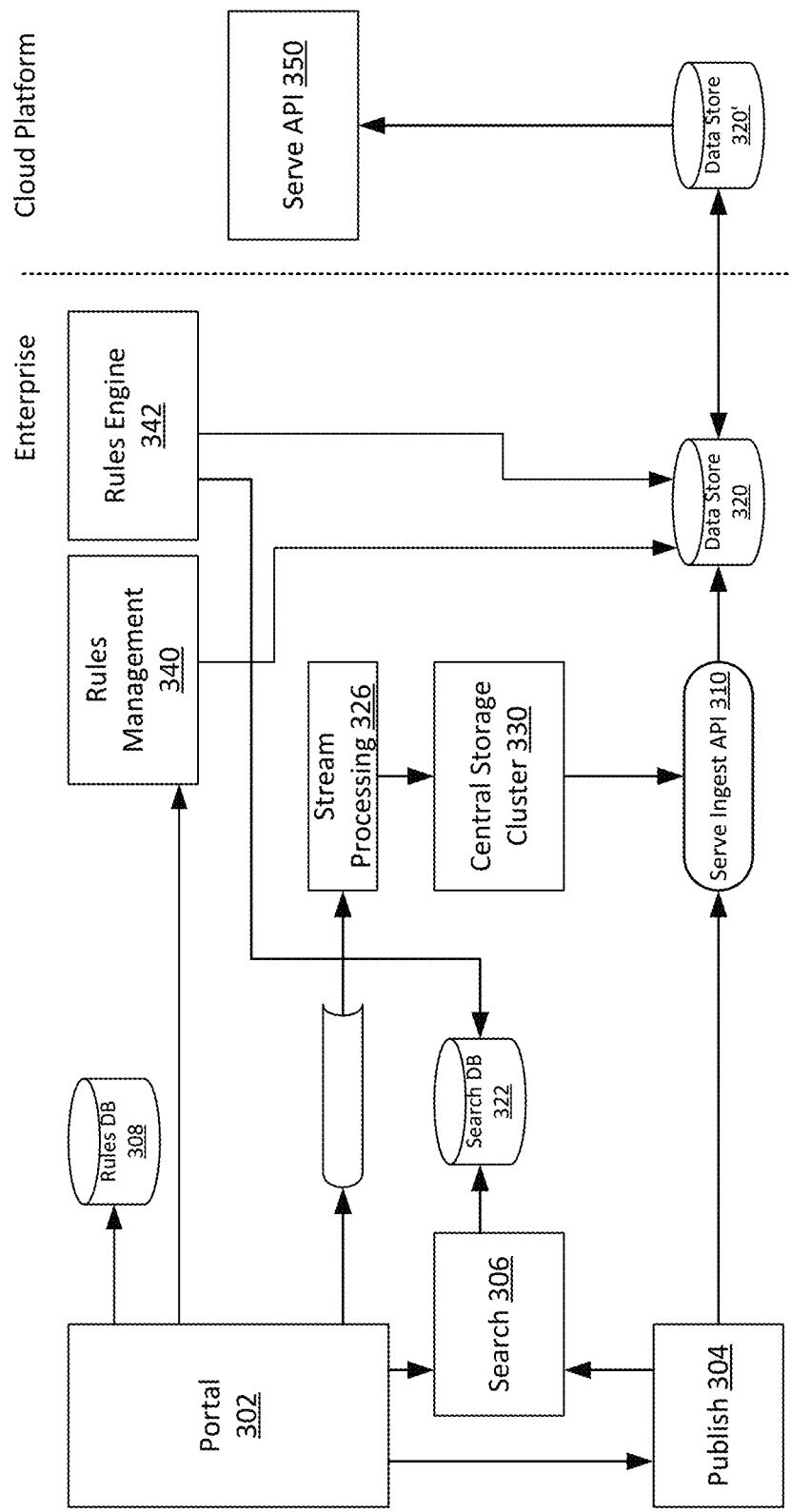
FIG. 3 is a block diagram of an example item recommendation control platform, according to an example embodiment.

Referring now to FIG. 3, an example architecture of the recommendation management platform 100 is illustrated. In the example shown, the recommendation management platform 100 includes a portal 302 accessible by the recommendation administrator 60 of FIG. 1. The portal 302 allows the recommendation administrator 60 to define various rules as described above. In response to input from the recommendation administrator 60, as further described below, the portal 302 provides rules to a publication interface 304, a search interface 306, as well as a rules database 308. The rules can include, for example, behavioral rules as well as cross-selling rules (ICS rules).

In the example shown, the publication interface 304 formats the received rules according to a predetermined definition of specific types of rules, and applies the rules to one or more individualized products to which the rules may apply. For example, the publication interface 304 may associate a rule with a particular item identification number. The publication interface 304 provides the rule and associated identification number two and ingestion API 310, which may then store that information in a database 320 that maintains rule and item associations.

In the example shown, the search interface 306 receives the defined rules from the portal 302, as well as the correlation between rules and item identifiers from the publication interface 304, and indexes those rules and items for storage of an index in a database 322 which maintains the exploded rule and item correlations. The rules database 308 also stores the defined rules for later access, e.g., by various rules management and processing components described below.

In the example shown, the publication interface 300 further outputs the exploded rules to a stream processing service 326, which can be used to import those rules and item associations into a central storage cluster 330. The central storage cluster 330 may represent a large-scale enterprise storage solution used for storing big data for a retail enterprise. The central storage cluster 330 may also provide data to the ingestion API 310, for example for delivery of item detail in association with the item and rule correlations when used to deliver item recommendations. Information from the central storage cluster 330 may be combined at ingestion API 310 with a published rule provided by the publication interface 304, for storage in the database 320.

In addition, a rules management engine 340 may allow the portal 302 to access rules stored in the database 320, for example for viewing, editing, etc. The rules management engine 340 may allow a user accessing the portal 302 (e.g., user U1 via recommendation administrator 60) to define a hierarchy of rules for a given node within a retail website, access specific filters, or perform other operations on existing rules. A rules engine 342 provides additional processing or reprocessing of rules stored in the database 320, as well as rule definitions stored in the search database 322.

In the example shown, the recommendation management platform 100 includes an enterprise computing device that may be supplemented by a cloud platform. In the example shown, the cloud platform includes a further database 320', which is a replicated version of database 320. The database 320' may serve item recommendation rules via a serve API 350, for example to web server 12. The use of a cloud platform as part of the recommendation management platform 100 allows for scalability of requests to the serve API 350, given the expected high volume of requests (a request per instance of display of a page at a retail website).

Figure 4:
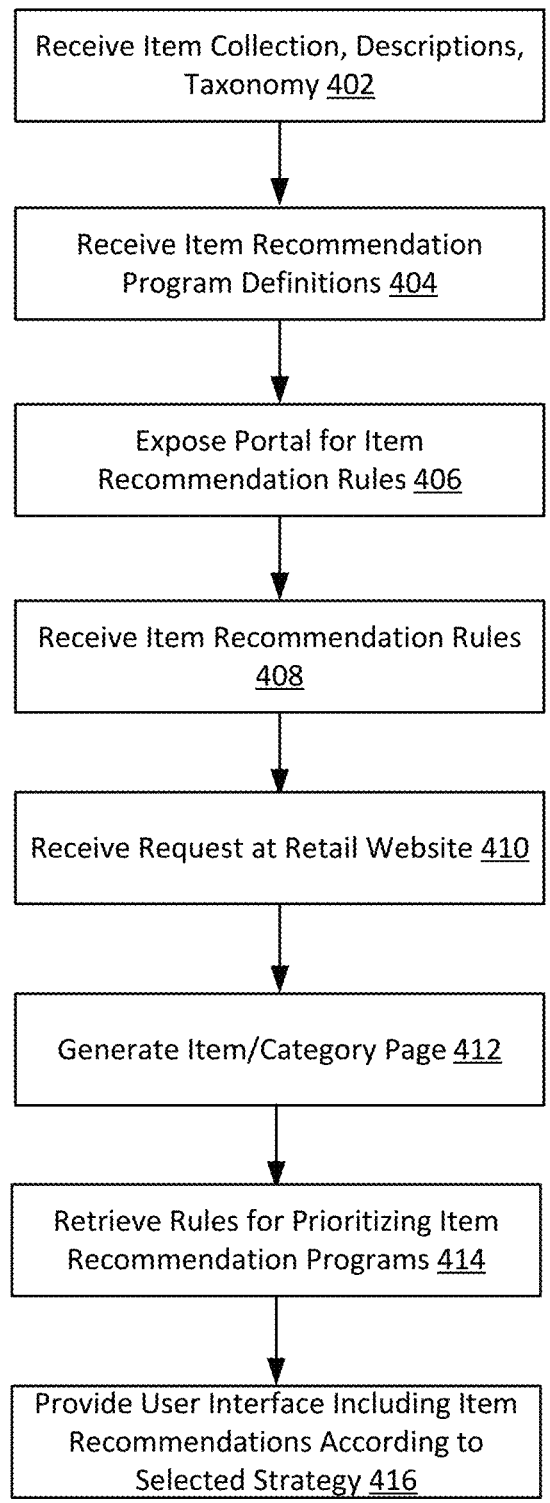
FIG. 4 is a flowchart of an example method of operation of an item recommendation control platform, according to an example embodiment.

FIG. 4 is a flowchart of an example method 400 of operation of an item recommendation control platform, according to an example embodiment. The method 400 may be performed, for example, either by the recommendation management platform 100, or such a platform in combination with a web server 12. Other networked structures may be used to implement aspects of the method 400 as well.

In the example shown, the method 400 includes receiving an item collection, descriptions of items, and a taxonomy of items (step 402). The item collection and taxonomy may be used to generate a user interface that displays a retail website taxonomy, for example which may have a plurality of nodes (item detail webpages, item category webpages, and other types of webpages), each of which may be associated with and able to display one or more item recommendations. Additionally, the method 400 includes receipt of item recommendation and program definitions (step 404). The item recommendation and program definitions may include, for example, one or more item recommendation rules, themes, or strategies that may be associated with one or more retail website webpages. Example item recommendation programs may include behavioral programs (used to generate recommendations for particular users in response to user activity), cross-selling programs (used to present similar or complementary items to a particular item being displayed to a user), or theme-based recommendation programs (used to present a thematic collection of item recommendations to the user). Other types of item recommendation programs may be used as well. Generally, the item recommendation program definitions may be stored within a database managed by a recommendation management platform, or may be stored remotely from the recommendation management platform so long as they are accessible thereto.

In the example shown, the method 400 further includes exposing a portal, for example via a user interface (step 406), to allow an administrative user (e.g., U1 of FIG. 1) to view, edit, or create new item recommendation rules and strategies associated with particular nodes within a retail website. The method 400 further includes receiving a definition of one or more item recommendation rules (step 408). The item recommendation rules may define or select a particular type of item recommendation strategy or algorithm to be used when an item recommendation is to be displayed on a webpage of a retail website. For example each item recommendation rule may include a selection or identification of an item recommendation algorithm, one or more filters associated with the item recommendation algorithm, and one or more limits on minimum and/or maximum numbers of items to be presented to a user that are based on the particular algorithm. Additionally, in some instances, an item recommendation rule may include selection of a plurality of item recommendation algorithms, with the user interface or another user interface provided by the recommendation management platform 100 configured to receive a prioritization among such algorithms. Details regarding example user interfaces are provided below.

In the example shown, the method 400 further includes receiving a request at a retail website (step 410). The request at the retail website may be received from a customer user U2, for example using one of computing devices 20, 22 of FIG. 1. The request may be to receive or view a particular page of a retail website, such as an item detail page or an item category page. Generally, an item detail page displays one particular item, as well as details regarding that item such as a product description, price, availability, reviews, etc. An item category page may display a plurality of items that all fall within a given category. For example, an item category page may present a collection of items having common characteristics, e.g., women's sweaters, men's pants, dairy, furniture, etc. In response to the request, the method 400 includes generating an item page (step 412). Generating the item page includes retrieving, by a Web server 12, details regarding the particular one or more items from an inventory server 24, and configuring such details for display in a user interface.

In the example shown, the method 400 further includes retrieving one or more rules for prioritizing item recommendation programs associated with the particular page that is the subject of the request (step 414). The one or more rules may be retrieved, for example, via a server API 350 of the recommendation management platform 100 by the web server 12. Specifically, the web server 12 may provide to the recommendation management platform 100 and identity of a particular page that is to be presented to a user, and the recommendation management platform may respond with the one or more rules that are to be applied at that page. This may include, for example, identification of specific recommendation algorithms to be used, a prioritization of those recommendation algorithms, and a manner of display of the items recommended as part of the generated recommendation. Alternatively, the manner of display may be provided alongside a selection of a plurality of items to be presented as part of the recommendation display portion of the page. In other words, resolution of an item recommendation algorithm may be performed either by the Web server 12 or by the recommendation management platform 100. Once the item page is generated and any recommendations that are to be applied determined, the method 400 includes providing a user interface including those item recommendations according to a selected strategy defined at the recommendation management platform 100 to a user device (step 416). The generation and presentation of the item page, including all such recommendations, is managed by the web server 12, for delivery to user devices 20, 22.

Figure 5:
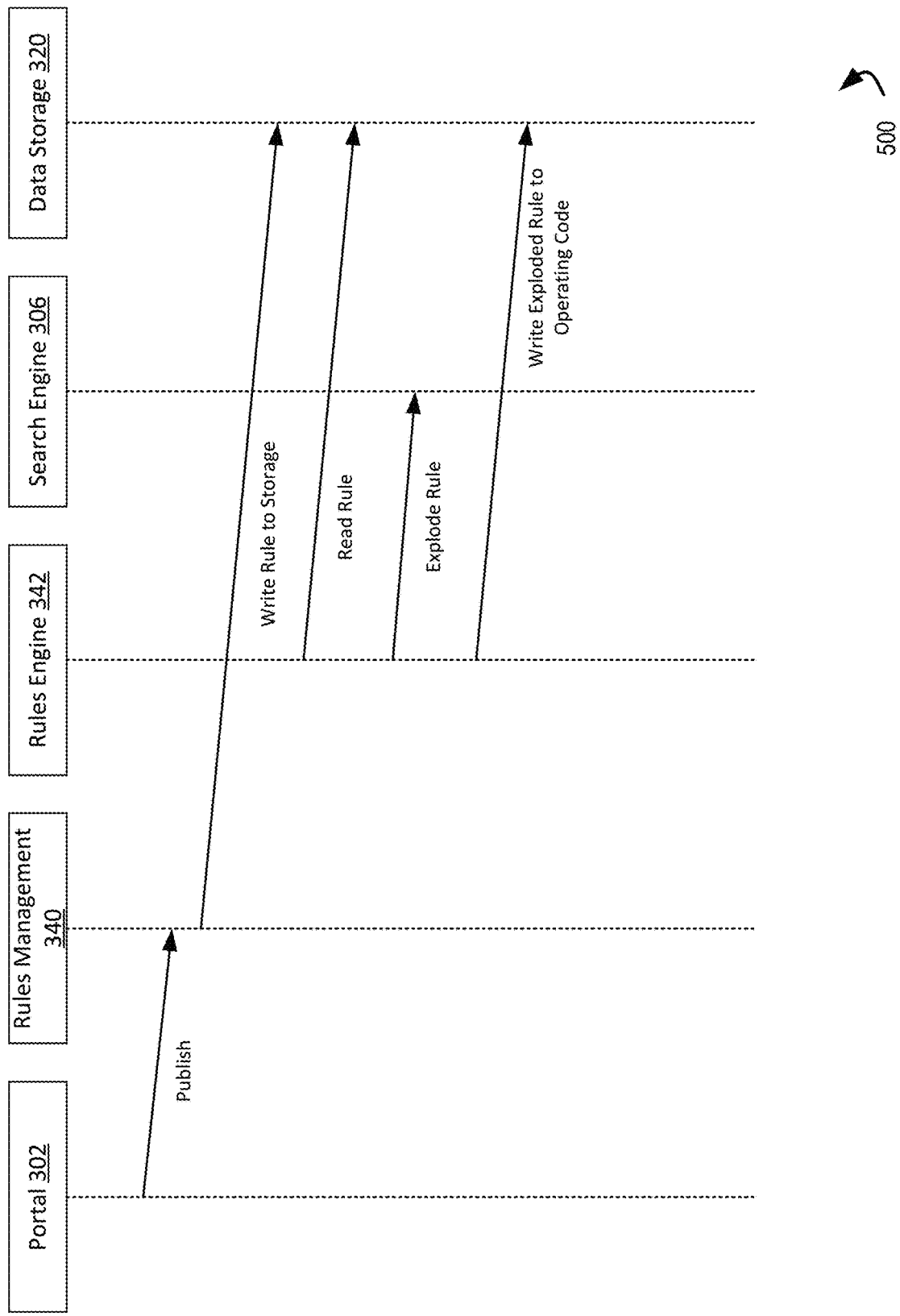
FIG. 5 is an example message flow diagram for creation of a behavioral rule within the item recommendation control platform of FIG. 3.
Figure 6:
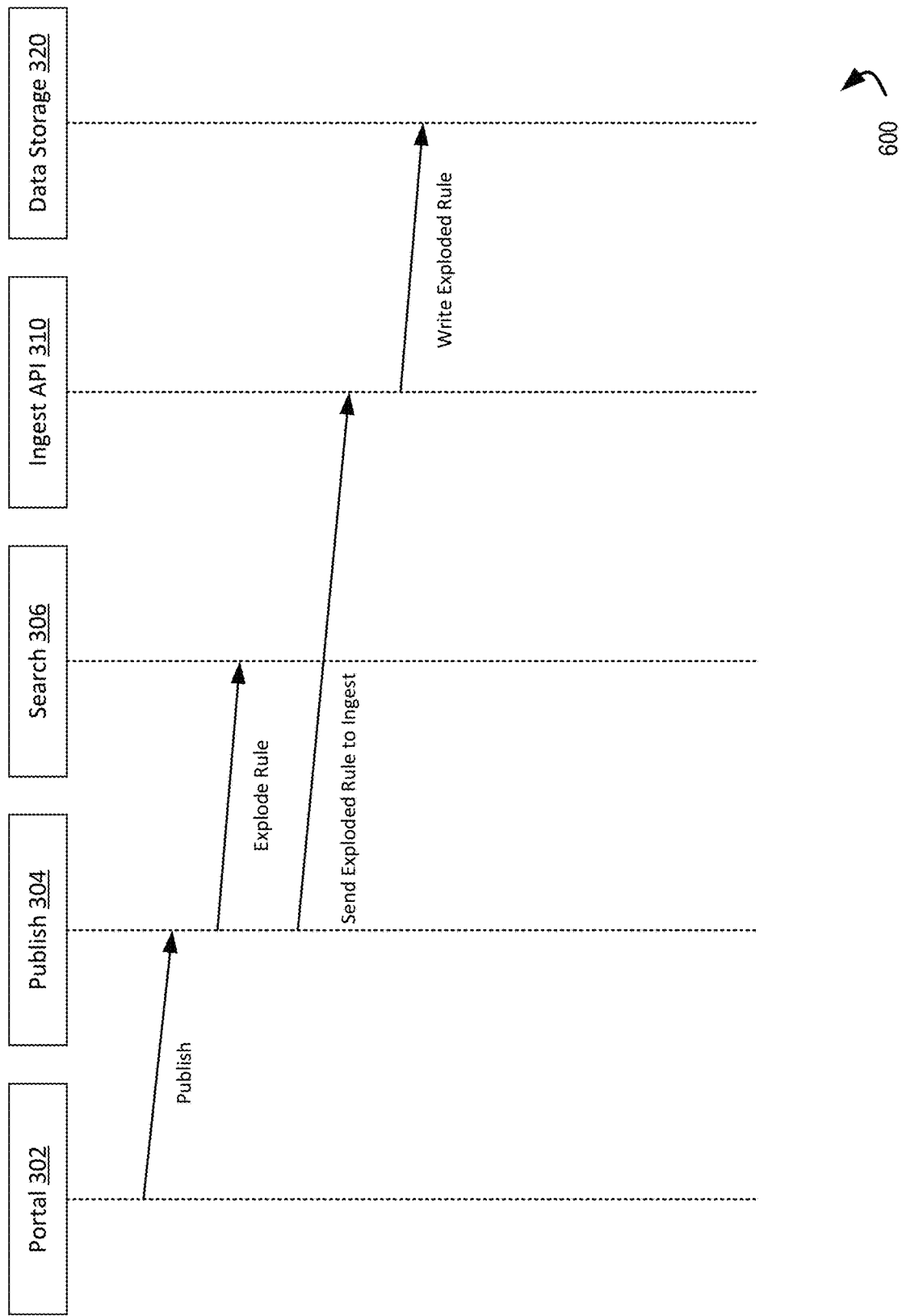
FIG. 6 is an example message flow diagram for creation of a cross-selling rule within the item recommendation control platform of FIG. 3.
Figure 7:
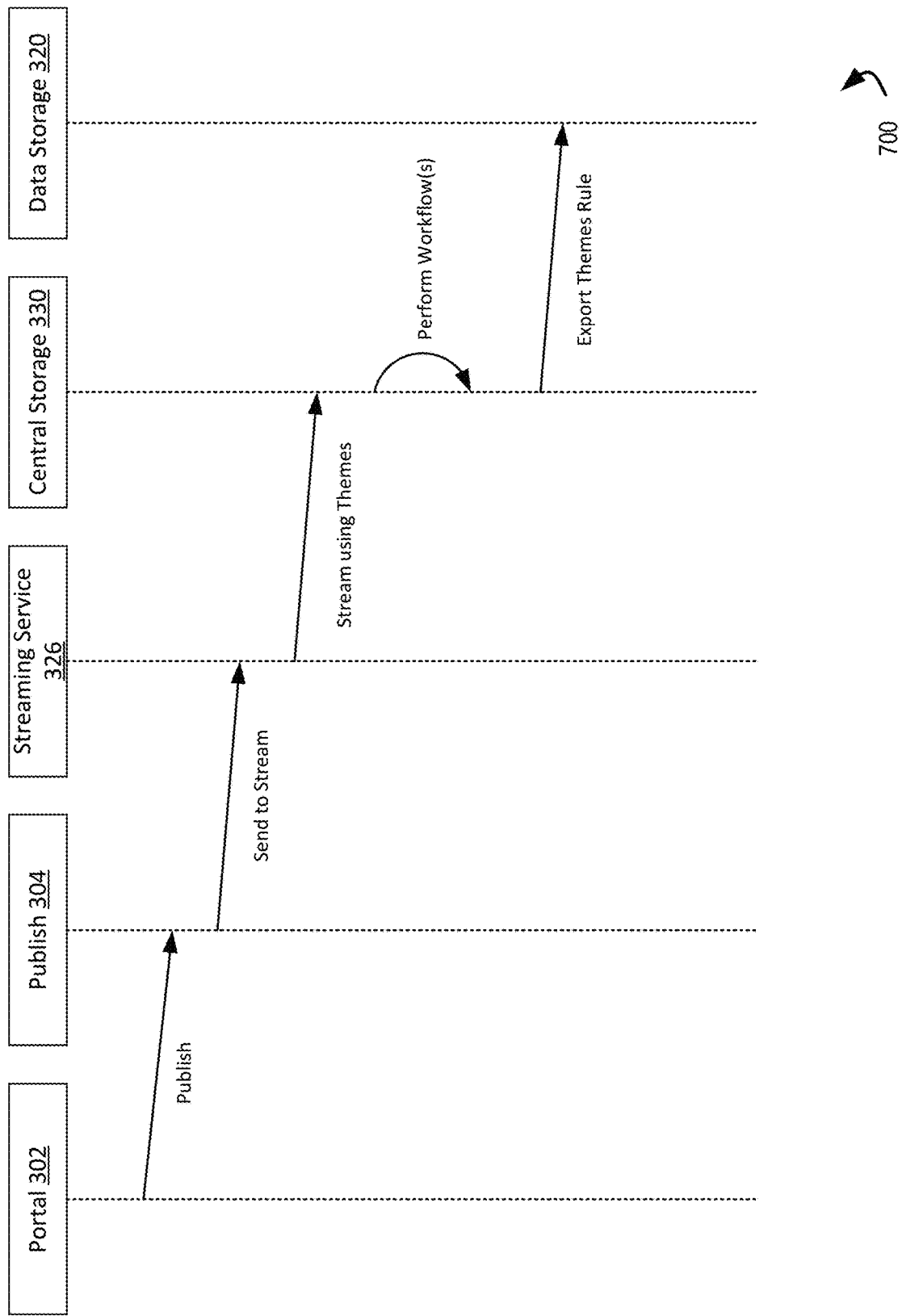
FIG. 7 is an example message flow diagram for creation of a theme rule within the item recommendation control platform of FIG. 3.

Referring now to FIGS. 5-7, example message flows are illustrated for generating various types of item recommendation rules within the recommendation management platform 100. The message flows are shown to illustrate sequences utilized to create item recommendation rules among the architectural elements illustrated in FIG. 3.

FIG. 5 is an example message flow diagram 500 for creation of a behavioral rule within the item recommendation control platform of FIG. 3. A behavioral rule may, for example, reflect specific types of behaviors of a user, such as a top seller rule, a related product rule, or a product bundle creation rule. In examples, a behavioral rule may include a rule to specifically include a particular item, specifically exclude a particular item, boost the likelihood of a particular item appearing within a recommendation, or manually include specific item identifiers to ensure the appearance of an item within a given recommendation. Such rules may be generated, at least in part, based on activity of a particular user, with specific items presented as part of a recommendation selected at a time that the user visits a particular node (webpage) of the retail website associated with the rule.

In the example shown, a rule received at the portal 302 may be published to the rules management module 340. The rules management module 340 will then write the rule to storage, at database 320. Subsequently, a rules engine 342 may read the rule from the database 320, and "explode" the rule. Exploding the rule may include, for example, applying the rule to each node of a plurality of nodes within a retail website, or may include generating a specific rule combination to be included at a particular node of a retail website. The rules engine 342 may then write the exploded rule to operating code, for example in database 320.

FIG. 6 is an example message flow diagram 600 for creation of a cross-selling rule within the item recommendation control platform of FIG. 3. A cross-selling rule may correspond, for example, to a rule for generating recommendations suggesting purchase of a different item as compared to, or in addition to, the item currently being viewed. Example cross-selling rules may include rules for suggesting alternative products to consider, rules to consider complementary products, or rules to identify other products within a given collection having similar characteristics to the item currently being viewed.

In the example shown, the rule is received at the portal 302 and provided directly to a publication interface 304. The publication interface 304 may explode the rule and provide the exploded rule to a search engine 306, as well as send the exploded rule to the ingest API 310. The ingest API 310 may then write the excluded rule to the database 320.

FIG. 7 is an example message flow diagram for creation of a theme rule within the item recommendation control platform of FIG. 3. A theme rule may correspond, for example, to a rule defining a manner of display of one or more sets of recommendations on a retail website. For example, a rule defining a number of products to include in a given recommendation, or a number of different recommendations to display associated with a given item category or item detail page may be included within such a theme rule.

In the example shown, a rule received at the portal 302 may be published to the publication interface 304. The publication interface 304 may send the rule to streaming service 326, which may in turn stream the rule as a theme to a central storage 330. The central storage 330 may have one or more workflows performed on it, for example to define specific display templates for inclusion on a retail website. Upon completion, the themes rule may be propagated to database 324 use.

Now referring to FIGS. 8-16, various user interfaces are displayed which may be presented to an administrative user (e.g., user U1, via recommendation administrator 60) are provided. Generally, the user interfaces may be presented on a screen 802 via user interface 804. In examples, the user interface 804 is presented on a display 806 such as a touch screen display.

Figure 8:
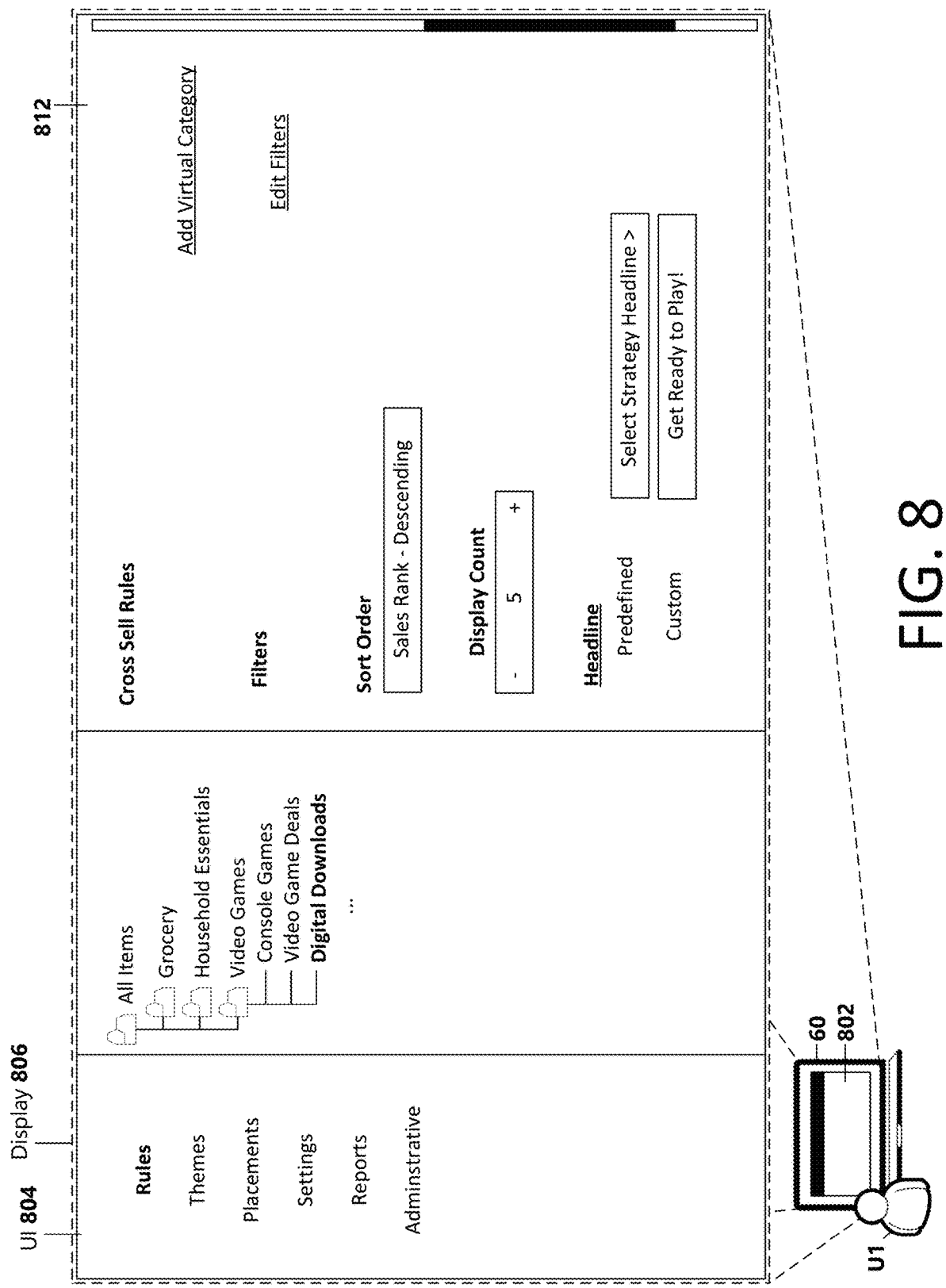
FIG. 8 is an example user interface for defining rules for a particular node within a retail website, which may be generated by an item recommendation control platform.

In the example shown in FIG. 8, the user interface 804 presents a rule definition region 812 in which various rules may be defined. As seen in the rule definition region 812 of FIG. 8, a taxonomy of goods may be displayed, with a selected good or category of goods ("digital downloads" in the example shown) able to have one or more rules defined associated there with. In the example, the rule definition region 812 displays a cross sell rule; however other types of rules may be defined. In this example, a virtual category may be defined and one or more filters may be selected to include or exclude specific items within the recommendation provided by the cross sell rule. Within the rule, an ordering of items may also be defined, alongside a number of items that would be displayed at one time. In this example a sales rank is used to define the ordering of items as they may appear, and five items are designated as being displayed at once. A user may define a custom headline or select a predefined headline for use with the display of the particular item recommendation.

It is noted that although the rule in FIG. 8 is described as being associated with digital downloads, the rule may be defined to be associated with a particular item, or with a larger group of items. Furthermore, the rule may be propagated for use with multiple categories or items.

Figure 9:
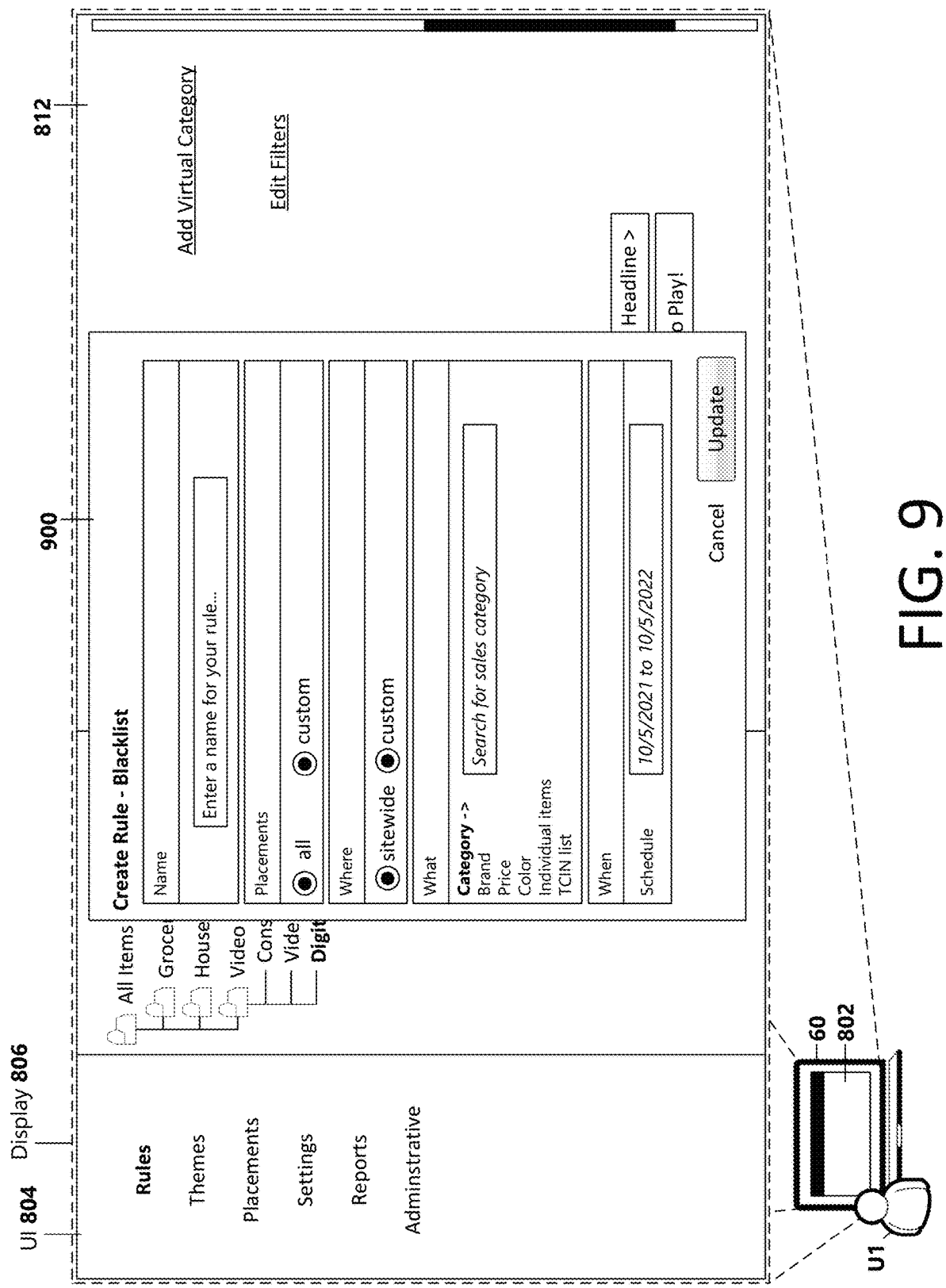
FIG. 9 is an example of the user interface of FIG. 8 showing an exclusion rule that may be implemented using the item recommendation control platform.

FIG. 9 is an example of the user interface of FIG. 8 showing a definition of an exclusion rule that may be implemented using the item recommendation control platform. In particular, an exclusion rule definition window 900 may be displayed, in which a user may provide a name for the exclusion rule, a selected set of placements, a set of locations, and particular items that are the subject of the rule as well as a timeframe for the rule. Specifically, an exclusion rule may be applied to all or a custom set of recommendation placements, and may be applicable either sitewide or on a particular subset of a retail website. Furthermore, specific items or categories of items may be selected for exclusion from recommendations, for example specific categories of items, brands, prices, colors, or individual items defined by item identifier may be excluded from item recommendations within all or some portion of a retail website. Additionally, a set of applicable dates may be used to define when the exclusion rule is to be used. Accordingly, specific items may be made effectively unavailable for presentation in a recommendation due to, for example, lack of availability or other reasons.

Figure 10:
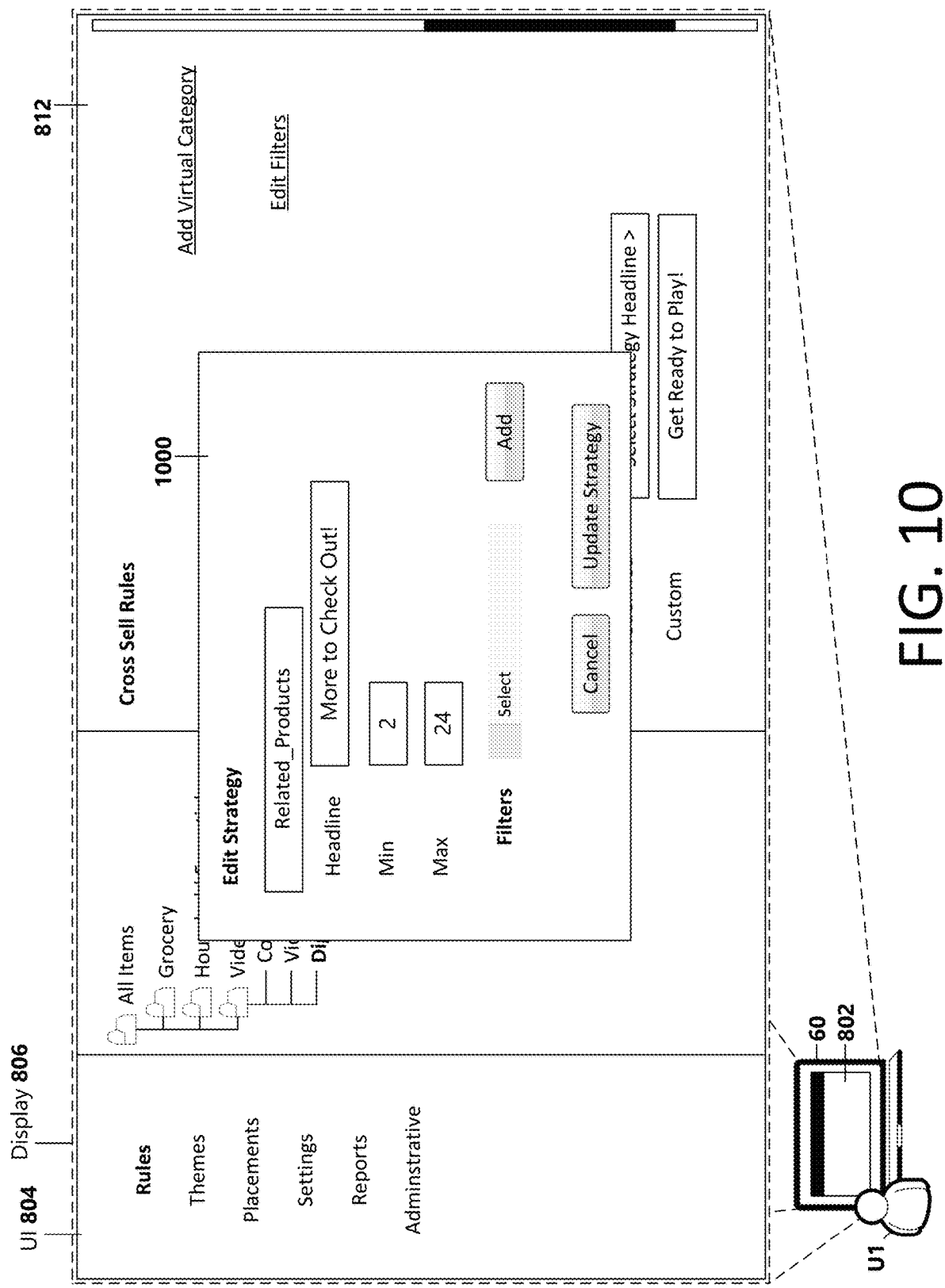
FIG. 10 is a further example user interface for defining a cross-selling rule within the item recommendation control platform.

FIG. 10 is a further example variation of a user interface for defining a cross-selling rule within the item recommendation control platform. In FIG. 10, a strategy edit window 1000 is displayed, for example in response to selection of an "Edit Filters" option within the rule definition region 812 of FIG. 8. In this example, a user may have selected to edit a particular strategy associated with a rule, such as the cross sell rules of FIG. 8. In the example shown, the strategy may be defined as presenting related products or other types of product recommendations. The strategy edit window 1000 includes options to define a minimum and maximum number of related products that may be presented as part of a recommendation. Additionally, specific filters may be applied to ensure that certain types of items are prioritized.

Figure 11:
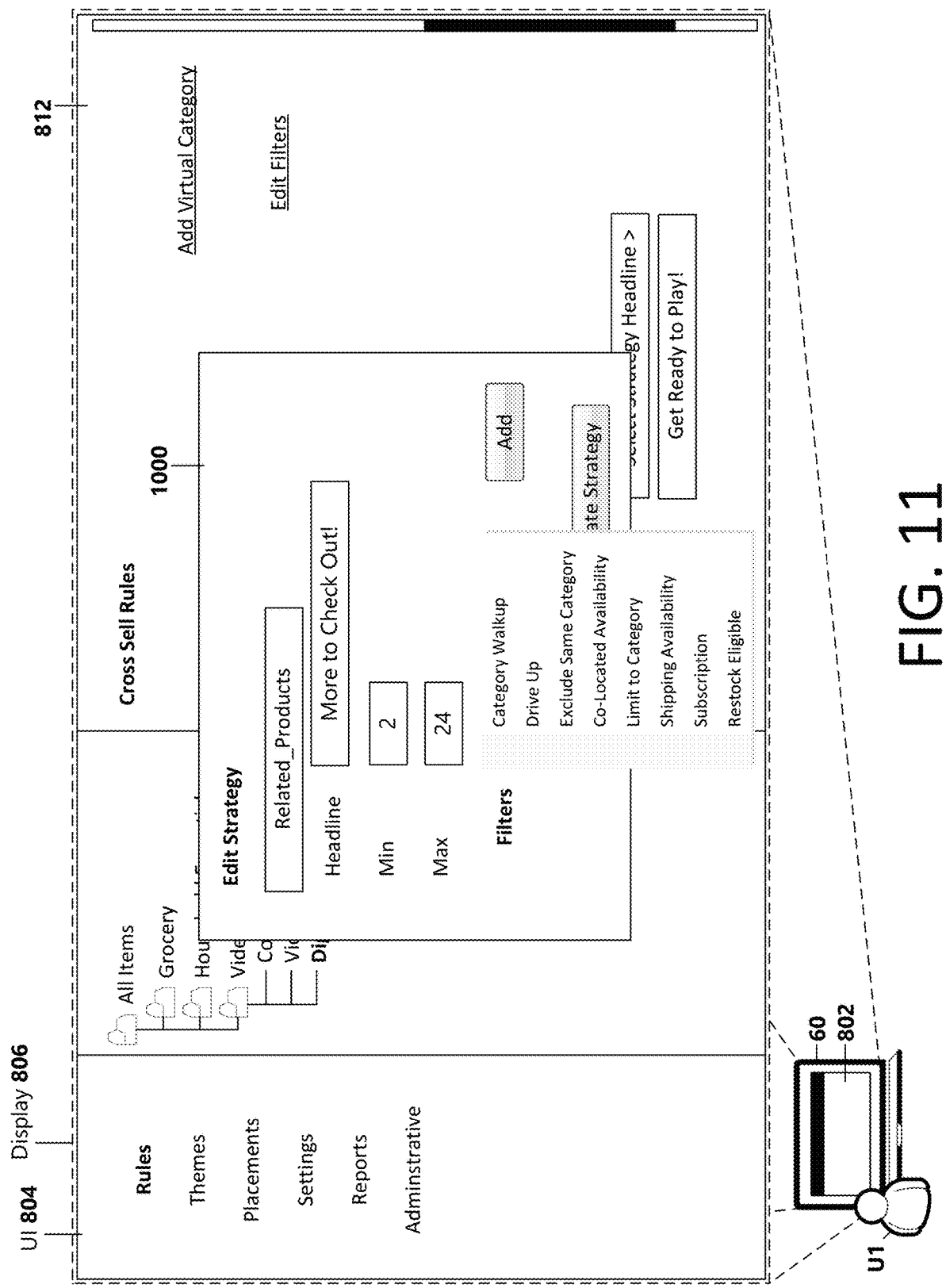
FIG. 11 is a further illustration of the user interface of FIG. 10 showing a drop-down menu illustrating a set of example filters available for use in definition of a rule useable at a particular node within a retail website.

FIG. 11 is a further illustration of the strategy edit window 1000 of FIG. 10 showing a drop-down menu illustrating a set of example filters available for use in definition of a rule useable at a particular node within a retail website. As illustrated, the filters can include a variety of types of filters relating to characteristics of particular items, customers, or locations. In particular, as illustrated in FIG. 11, filters exist to limit products to those eligible for a walk up pickup, a drive up pickup, or having a particularized shipping availability (e.g., that may be fulfilled within a predetermined shipping window). Additionally, an option may be included to exclude other items from the same category (to avoid confusing a user by presenting a number of similar items) or may only present items having co-located availability (e.g. so that the current item and the recommended items could be shipped together). Still further, a filter option may be included to limit recommended items to those within the same category. Other filter options include limiting recommendations to those for which a subscription is available, or which are eligible for a particular fulfillment option (e.g., a re-stock option which involves a regular pickup of certain stable items).

FIG. 12 is an example user interface for defining a hierarchy of strategies useable in an adaptive rule that can be executed upon receipt of an "add to cart" operation by a user of a retail website. In particular, FIG. 12 illustrates an overlay of a strategy prioritization window 1200 that may be used to define an ordering of rules that have been previously created. In the example shown, a set of rules that are included within an overall strategy, e.g., a placement, as illustrated which includes a cross-selling rule, a product bundling rule, a related product rule, and a top sellers rule. Generally, this combination of rules will allow an administrative user to prioritize an effort to cross sell items relative to a given item or category of items, with secondary emphasis on bundling or related products. If an inadequate number of available related products exist for a given item, the rule will revert to top sellers within a given category, to ensure an adequate number of items are included within a given recommendation within a customer user interface as illustrated below.

Figure 13:
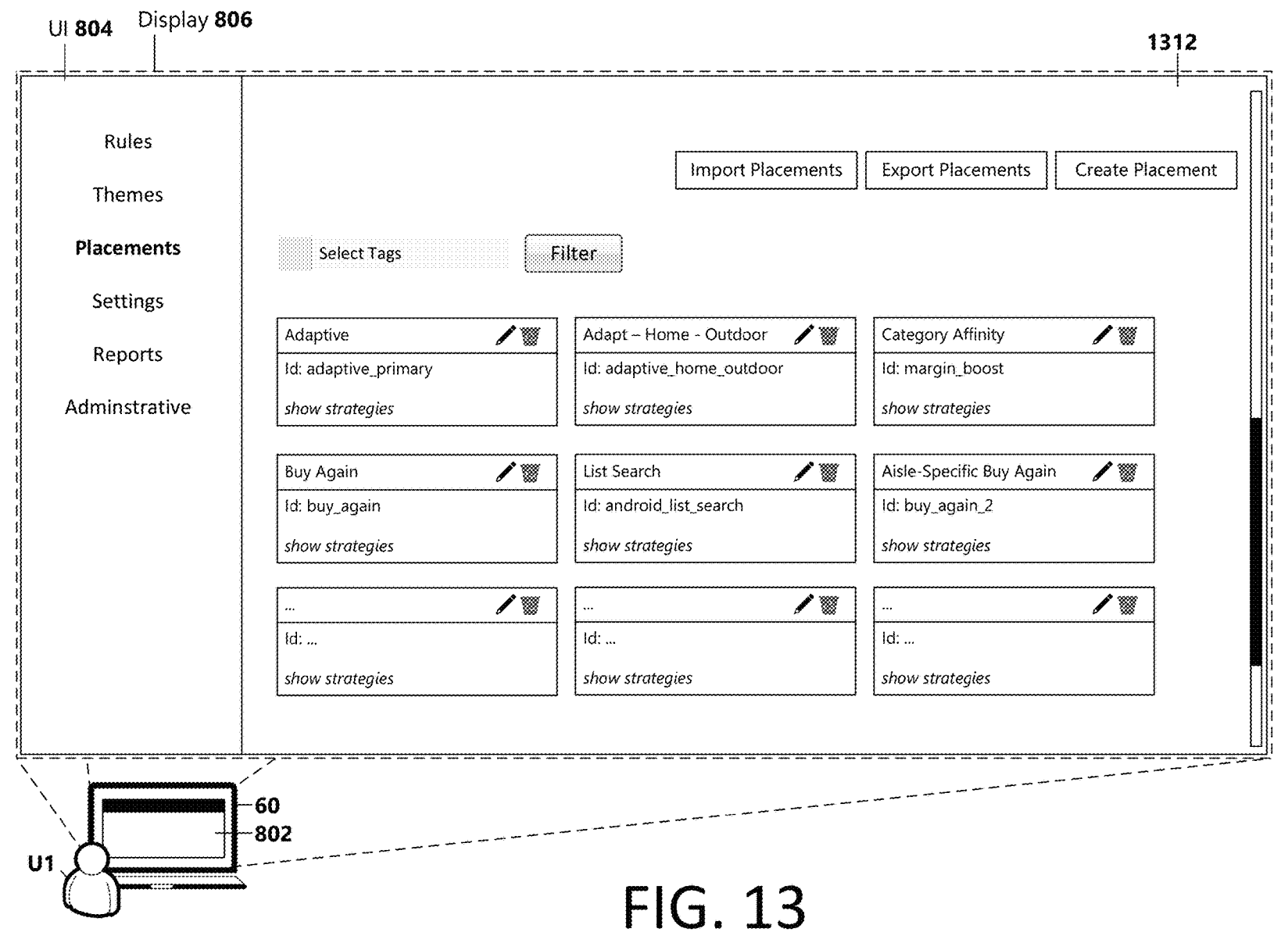

FIGS. 13-16 illustrate example placements that may be able to be created using the recommendation management platform 100 described herein. FIG. 13 illustrates the user interface 804 with the "placements" selection highlighted, resulting in display of a placements sub-screen region 1312. The placements region 1312 allows the user to define one or more placements of item recommendations within a retail website. Within the placements region 1312, a listing of placements that have been created is displayed, alongside options to search for and filter among the placements, as well as options to import, export, or create new placements.

Figure 14:
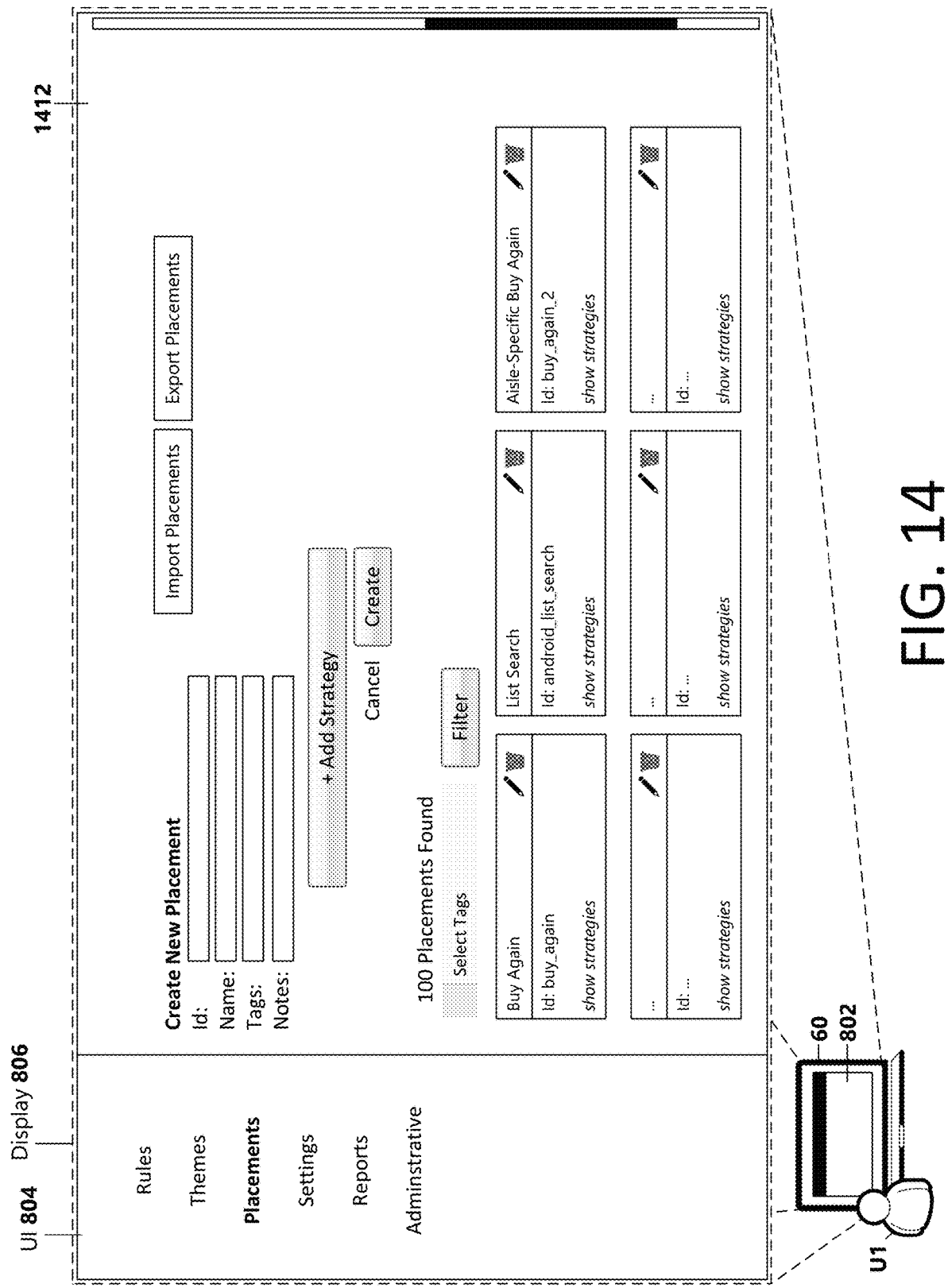
FIG. 14 is an example user interface for defining a new placement of item recommendations within a retail website.
Figure 15:
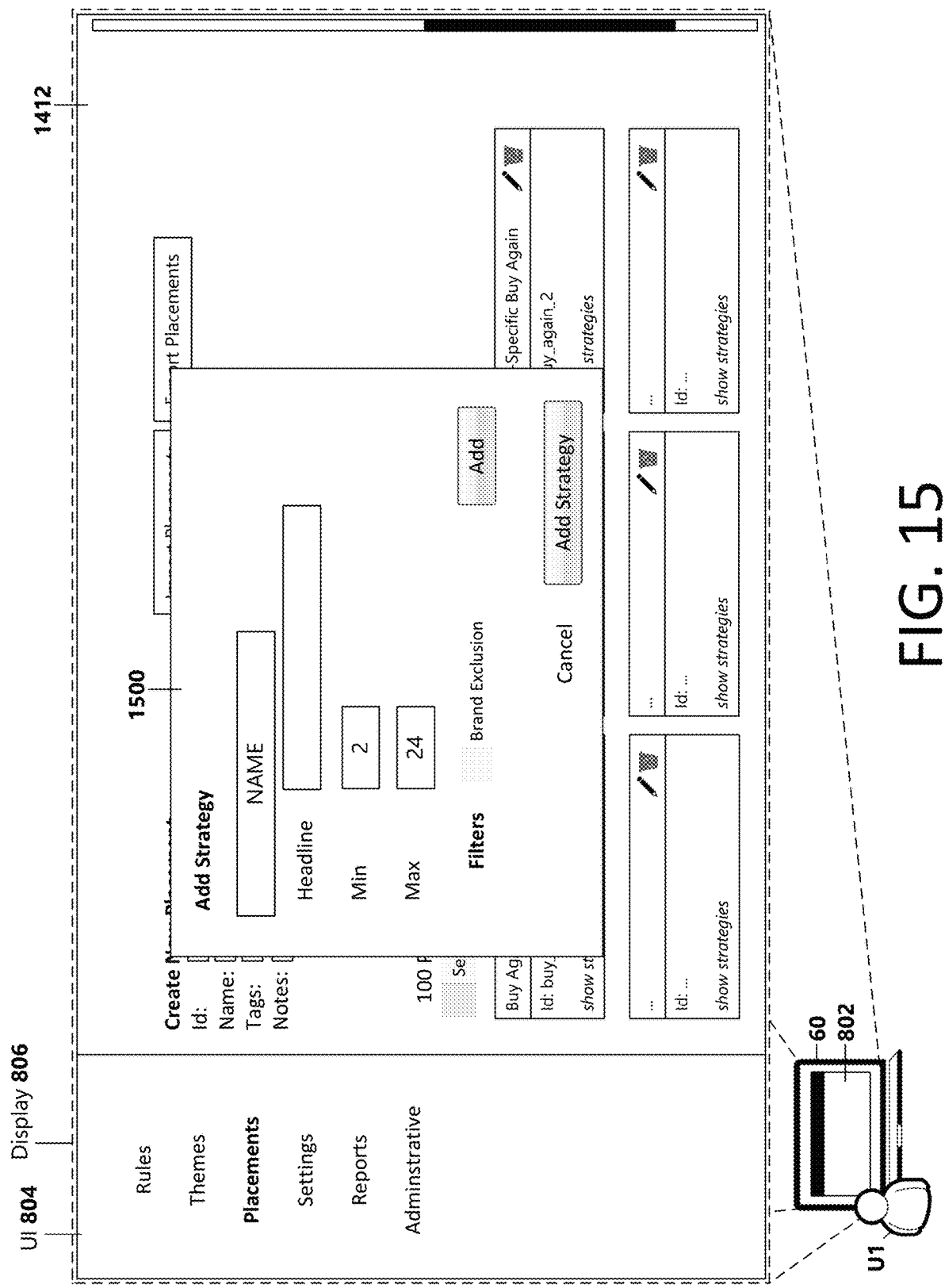
FIG. 15 illustrates the example user interface of FIG. 14 in which a strategy may be added to a particular placement, according to an example implementation.

FIG. 14 is an example feature of a user interface in which a new placement may be defined for item recommendations within a retail website. In the example shown, the user interface 804 includes a placement creation region 1412. The placement creation region 1412 may be displayed in response to selection of an option to create a new placement within the placements region 1312 of FIG. 13. Upon selection of an add strategy option within the placement creation region 1412, as seen in FIG. 15, an add strategy window 1500 can be displayed. The add strategy window 1500 is generally analogous in appearance and options to the strategy edit window 1000 of FIG. 10.

Figure 16:
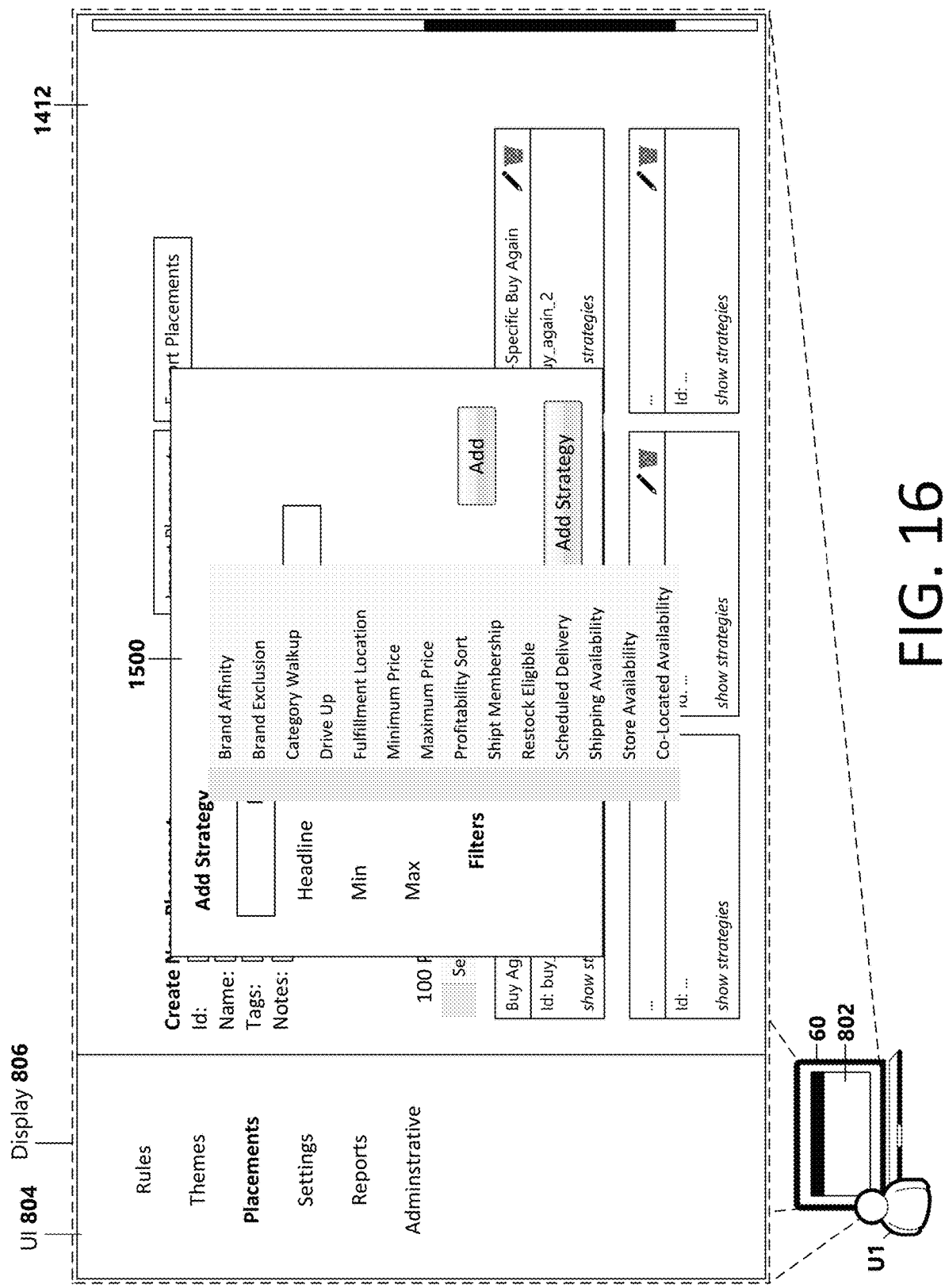
FIG. 16 illustrates selection of filters within the example user interface seen in FIGS. 14-15, according to an example implementation.

FIG. 16 illustrates selection of filters within the add strategy window 1500 of FIG. 15, generated in response to selection of the option to create a new placement in the placement creation region 1412 of FIG. 14, according to an example implementation. As seen in FIG. 16, a number of possible filters may be added to any strategy. These filters may be the same as those mentioned above, or may include additional filters. In the specific example shown, the filter options include: a brand affinity filter in which specific brands are prioritized; a brand exclusion filter in which certain brands are excluded from a particular recommendation for placement; a category walk-up filter in which items within the category are first prioritized, followed by items within broader categories outside of the specific subcategory in which the item is found; a drive up filter in which items eligible for pickup at a store selected by the user or at which the current item is stocked may be listed; a fulfillment location filter which allows for identification of a particular fulfillment location (e.g., a store or a distribution center or grouping of stores); a minimum price filter; a maximum price filter; a profitability sort filter in which items of higher profitability to a retailer may be prioritized; a delivery service membership filter in which items eligible for same-day delivery via a same-day delivery service are prioritized; a restock eligible filter which items eligible for inclusion within a bulk goods reorder program may be included or prioritized; and various filters prioritizing items based on inventory location, such as a scheduled delivery filter that presents items which may be delivered within a particular time window (e.g. within two days), a shipping availability filter that limits the recommended items to those which are available to ship, a store availability filter that limits the recommended items to those actually stocked in store, or a co-located availability filter that would only recommend items that are available at a same store location as the item currently selected. Of course, other filters may be available as well for selection. Furthermore, one or more filters may be selected for any given strategy.

Now referring to FIGS. 17-20, example schematic features of user interfaces that may be presented to a customer user (e.g. user U2) at a customer computing device (e.g. computing devices 20, 22) are depicted. For example, the user interfaces may be presented to a user visiting a retail website hosted to that user's device via a web server 12. Generally, the user interfaces may be presented on a screen 1702 via user interface 1704. In examples, the user interface 1704 is presented on a display 1706 such as a touch screen display.

FIG. 17 is an example user interface illustrating aspects of a retail website that presents item recommendations according to a strategy selected using the item recommendation control platform. In the example shown, the user interface 1704 presents a shopping screen 1712. The shopping screen 1712, in the example shown, is an item detail page which presents details of a specific item, including a name of the item, images of the item, price, quality, store location availability, and other potential details.

In the example shown, the shopping screen 1712 includes a recommendation region 1714. The recommendation region 1714 can present one or more recommendations that are tied to specific strategies, placements, or rules defined as described above. In the example shown, the recommendation region 1714 presents three separate recommendation types, a more to consider type, a similar items type, and an also purchased type. The more to consider type may present items that are complementary to the item selected, while the similar items type may present other similar items that a user may purchase in place of the currently selected item displayed on the item detail page. The also bought type of recommendation may present to the user items which were purchased by other customers who chose to purchase the item currently presented on the item detail page. Accordingly, by selecting among the various types of recommendations, different assortments of items may be presented to the user.

Figure 18A:
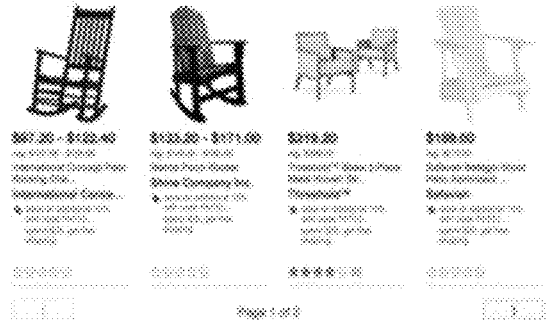
FIGS. 18A-D illustrate example changes in item recommendations based on varying strategies that may be defined in the item recommendation control platform.
Figure 18B:
Figure 18C:
Figure 18D:
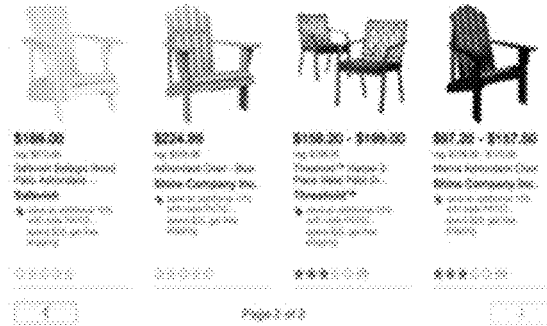

FIGS. 18A-D illustrate example changes in item recommendations based on varying strategies that may be defined in the item recommendation control platform. FIG. 18A illustrates a first item recommendation 1800 on similar items, unaffected by a particular modification to a recommendation (e.g. a behavioral modification set up in a behavioral modification rule). FIG. 18B illustrates a second page item recommendation 1820 that may be reached by a user scrolling through the item recommendations presented in the first item recommendation 1800. As seen in FIGS. 18C-D, a modified first item recommendation page 1840 and modified second recommendation page 1860 are displayed. In the modified first item recommendation page 1840, a particular item (in this instance, a green Adirondack chair) may be boosted by a particular behavioral rule from the second recommendation page 1820 to a modified first recommendation page 1840. Accordingly, the boosted item becomes more visible to a user. Various other rules may, for example, specifically include items that may not otherwise be included within a recommendation page, specifically exclude other items, or adjust strategies for specific items as previously described.

Figure 19:
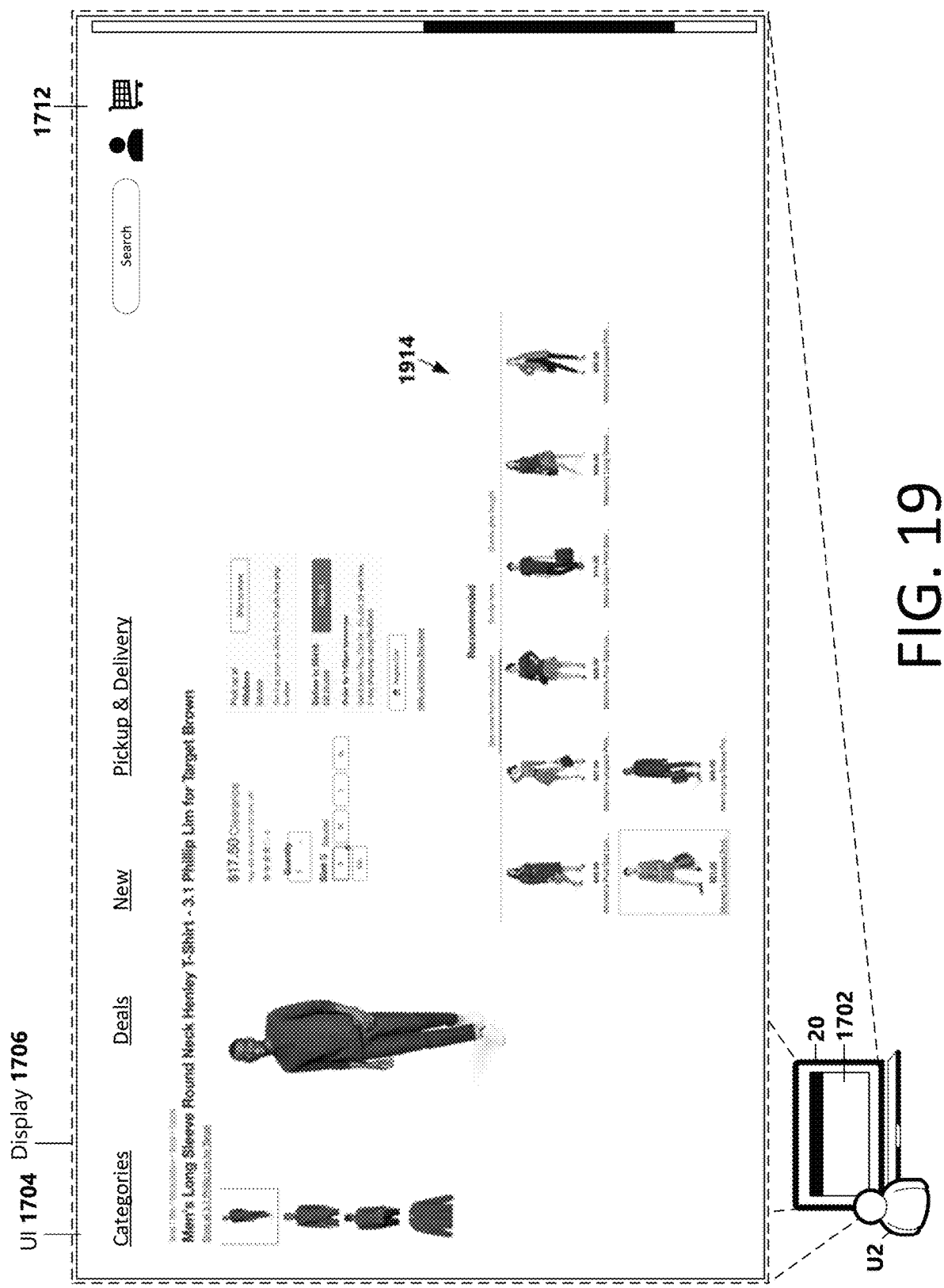
FIG. 19 is an example user interface illustrating aspects of a retail website that presents multiple sets of item recommendations according to different strategies controlled by the item recommendation control platform.
Figure 20:
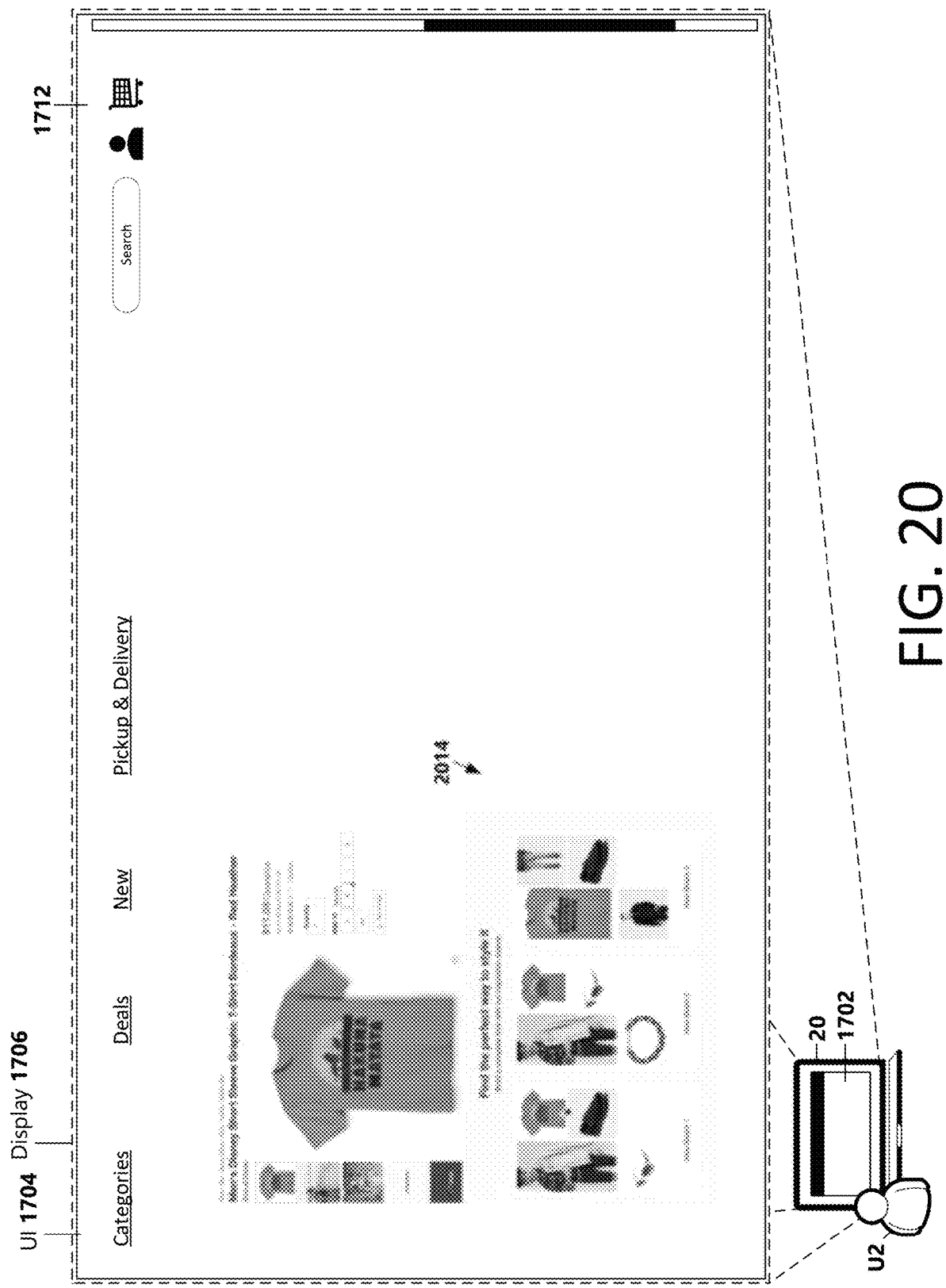
FIG. 20 is an example user interface illustrating aspects of a retail website that presents multiple items in an item recommendation controlled by the item recommendation control platform.

FIGS. 19-20 illustrate additional possible types of item recommendation appearances within a retail website. FIG. 19 is an example user interface illustrating aspects of a retail website that presents multiple sets of item recommendations according to different strategies controlled by the item recommendation control platform. In FIG. 19, the shopping screen 1712 presents an alternative recommendation region 1914. The recommendation region 1914 presents a set of other items within a given item collection (e.g., items provided by a common brand or provided for coordinated use). Similarly, in FIG. 20, a recommendation region 2014 presents a set of view boards, each of which includes a plurality of items. In this instance, the plurality of items within each view board may correlate with one another, for example as an overall outfit that may be worn by a user. In this way, a collection of related items may be generated using the rules and placements described above, to illustrate to a user potential complementary products that the user may be interested in while allowing the user to envision how those products may be used together.

Referring to FIGS. 1-20 overall, the methods and systems described herein, in particular the recommendation management system, can allow retailers to provide either broad or fine-grained control over item recommendations that may appear within a retail website according to the particular goals of that retailer. Additionally, a retailer may merge and prioritize multiple such goals within a given recommendation, or across multiple recommendations on a single item or category page of such a website. Accordingly, as retailers develop a variety of item recommendation strategies and algorithms for identifying relevant items to be presented to a user, those strategies and algorithms may be selected, used on specific pages or sets of pages, and their efficacy assessed in a manner that provides centralized control over recommendation strategies without having to directly adjust the definitions of the item detail or item category pages of a website themselves. This provides significant centralization and flexibility advantages to a retailer which simplifies the creation and deployment of recommendation strategies.

While particular uses of the technology have been illustrated and discussed above, the disclosed technology can be used with a variety of data structures and processes in accordance with many examples of the technology. The above discussion is not meant to suggest that the disclosed technology is only suitable for implementation within a desktop website, but also could be used within a mobile application, or in any other instance in which item recommendations, particularly retail item recommendations, may be suitable for use.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An item recommendation control platform comprising:
a computing device having a processor and a memory, the computing device being communicatively connected to a retail web server, the memory storing instructions which, when executed, cause the computing device to:
expose a portal to an administrative user, the portal generating a rules user interface having a plurality of item recommendation rule definition options that allow the administrative user to define an item recommendation rule for a particular node within a retail website;
receive, prior to displaying the rules user interface, a selection of the particular node from a plurality of nodes corresponding to a plurality of webpages of the retail website;
display the rules user interface;
receive, via one or more of the plurality of item recommendation rule definition options, a definition of at least one item recommendation rule at the portal associated with the particular node;
publish the at least one item recommendation rule to a data store; and
upon receipt of a request from a retail web server regarding an item recommendation rule in association with the particular node, serve an item recommendation rule to the web server, the item recommendation rule defining a selection or prioritization of items to be displayed on a web page corresponding to the particular node;
wherein the selection or prioritization of items is based, at least in part, on at least one of inventory availability or shipping eligibility within a predetermined timeframe.

2. The item recommendation control platform of claim 1, wherein the particular node is at least one of an item detail page or an item category page.

3. The item recommendation control platform of claim 1, wherein the portal receives a plurality of item recommendation rules associated with the particular node, the instructions further configured to generate a second rules user interface at which a prioritization among the plurality of item recommendation rules is defined;
wherein the instructions, when executed, further cause the computing device to receive, via the second rules user interface, the prioritization among the plurality of item recommendation rules; and
wherein the instructions, when executed, further cause the computing device to, upon receipt of the request from the retail web server regarding the item recommendation rule in association with the particular node, serve the prioritization among the plurality of recommendation rules to the web server.

4. The item recommendation control platform of claim 1, wherein the item recommendation rule comprises at least one of a cross-selling rule, a behavioral rule, or a themes rule.

5. The item recommendation control platform of claim 1, wherein the item recommendation rule provides a selection or prioritization of items based on shipping eligibility within the predetermined timeframe, and wherein the predetermined timeframe is a selected timeframe defined by a customer user of a retail web site.

6. The item recommendation control platform of claim 5, wherein the selected timeframe is determined based on one or more other items selected by the customer user and included within a shopping cart of the customer user.

7. The item recommendation control platform of claim 1, further comprising a cloud server communicatively connected to the computing device, wherein the request from the retail web server is received at the cloud server via a service API.

8. The item recommendation control platform of claim 7, wherein the item recommendation rule comprises an identification of a display type and one or more item identifiers for presentation via the retail web server as part of the web page corresponding to the particular node.

9. The item recommendation control platform of claim 1, further comprising a rules management module communicatively connected to the portal, the rules management module providing access to the database to edit and/or store the one or more rules.

10. The item recommendation control platform of claim 1, wherein the rules user interface includes a filter selection option in a strategy editing screen with which the administrative user can select one or more filters, the one or more filters including an inventory availability filter, a shipping eligibility filter, and a category filter.

11. The item recommendation control platform of claim 1, wherein a strategy editing screen displays a name of a strategy, a headline displaying editable text to be displayed on the web page corresponding to the particular node, and a minimum and maximum number of items to be presented as part of a selected strategy.

12. A system comprising:
a retail web server;
an item recommendation control platform comprising a computing device having a processor and a memory, the computing device being communicatively connected to the retail web server, the memory storing instructions which, when executed, cause the computing device to:
expose a portal to an administrative user, the portal generating a rules user interface having a plurality of item recommendation rule definition options that allow the administrative user to define an item recommendation rule for a particular node within a retail website;
receive, prior to displaying the rules user interface, a selection of the particular node from a plurality of nodes corresponding to a plurality of webpages of the retail website;
display the rules user interface;
receive, via one or more of the plurality of item recommendation rule definition options, a definition of at least one item recommendation rule at the portal associated with the particular node;
publish the at least one item recommendation rule to a data store; and
upon receipt of a request from a retail web server regarding an item recommendation rule in association with the particular node, serve an item recommendation rule to the web server, the item recommendation rule defining a selection or prioritization of items to be displayed on a web page corresponding to the particular node;
wherein, upon receipt of the item recommendation rule, the retail web server is configured to display the web page corresponding to the particular node including a recommendation region, the recommendation region displaying a plurality of items in accordance with the item recommendation rule, and wherein the selection or prioritization of items is based, at least in part, on at least one of inventory availability or shipping eligibility within a predetermined timeframe.

13. The system of claim 12, wherein the instructions at the item recommendation control platform further cause the item recommendation control platform to generate a second rules user interface at which a prioritization among the plurality of item recommendation rules is defined, wherein each of the plurality of item recommendation rules is associated with the particular node.

14. The system of claim 13, wherein the item recommendation control platform includes a cloud server communicatively connected to the computing device, wherein the request from the retail web server is received at the cloud server via a service API.

15. The system of claim 12, wherein the item recommendation control platform is further configured to, upon receiving the definition of the at least one item recommendation rule:
   explode the rule and send the exploded rule to an item search engine; and
   write the exploded rule to a rule database.

16. The system of claim 15, wherein the item recommendation control platform is further configured to, upon receiving the definition of the at least one item recommendation rule, publish the rule at a publishing module.

17. The item recommendation control platform of claim 1, the instructions further configured to:
   receive a selection of a plurality of nodes and a definition of a second item recommendation rule; and
   publish the second item recommendation rule in association with each of the plurality of nodes.

18. The item recommendation control platform of claim 1, wherein serving the item recommendation rule to the web server comprises providing at least one of (1) the definition of an item recommendation prioritization to be used by the web server, or (2) a definition of an item recommendation including a plurality of recommended items and a manner of display of the item recommendation.

19. The item recommendation control platform of claim 1, wherein the instructions, when executed, further cause the computing device to display two or more nodes of the plurality of nodes, the two or more nodes of the plurality of nodes including the particular node; and
   wherein receiving the selection of the particular node comprises receiving the selection of the particular node from the two or more nodes of the plurality of nodes.

* * * * *